(12) United States Patent
Ugaji et al.

(10) Patent No.: US 7,947,396 B2
(45) Date of Patent: May 24, 2011

(54) NEGATIVE ELECTRODE FOR NON-AQUEOUS ELECTROLYTE SECONDARY BATTERY, METHOD OF MANUFACTURING THE SAME, AND NON-AQUEOUS ELECTROLYTE SECONDARY BATTERY USING THE SAME

(75) Inventors: Masaya Ugaji, Osaka (JP); Masaki Hasegawa, Osaka (JP); Taisuke Yamamoto, Nara (JP); Keisuke Ohara, Osaka (JP)

(73) Assignee: Panasonic Corporation, Osaka (JP)

( * ) Notice: Subject to any disclaimer, the term of this patent is extended or adjusted under 35 U.S.C. 154(b) by 494 days.

(21) Appl. No.: 12/093,707

(22) PCT Filed: Nov. 7, 2007

(86) PCT No.: PCT/JP2007/071602
§ 371 (c)(1),
(2), (4) Date: May 14, 2008

(87) PCT Pub. No.: WO2008/072430
PCT Pub. Date: Jun. 19, 2008

(65) Prior Publication Data
US 2010/0151330 A1   Jun. 17, 2010

(30) Foreign Application Priority Data
Dec. 13, 2006   (JP) .................................. 2006-335409

(51) Int. Cl.
*H01M 4/58*   (2010.01)
(52) U.S. Cl. ................................................. 429/231.95
(58) Field of Classification Search .................... 427/58; 429/209, 212, 218.1, 231.95
See application file for complete search history.

(56) References Cited

U.S. PATENT DOCUMENTS
7,297,446 B2   11/2007   Fukui et al.
(Continued)

FOREIGN PATENT DOCUMENTS
CN   1534813 A   10/2004
(Continued)

OTHER PUBLICATIONS

Chinese Office Action, w/ English translation of relevant portion thereof, issued in Chinese Patent Application No. CN 200780001356.5 dated Mar. 26, 2010.
(Continued)

*Primary Examiner* — Jennifer K. Michener
*Assistant Examiner* — Carlos Barcena
(74) *Attorney, Agent, or Firm* — McDermott Will & Emery LLP

(57) ABSTRACT

A negative electrode for a non-aqueous electrolyte secondary battery, which reversibly inserts/extracts lithium ions includes a current collector (11) in which a concave portion (12) and a convex portion (13) are formed at least one surface thereof; and a columnar body (15) which is formed by laminating n (n≧2) stages of columnar body portions which are obliquely erected on the convex portion (13) of the current collector (11) and in which a content ratio of elements sequentially vary in a longitudinal direction of the current collector (11), and has a configuration in which variation directions of content ratios of elements of odd-numbered stages of columnar body portions and even-numbered stages of columnar body portions are different from each other. At least three surfaces (13a, 13b, 13c) of the convex portion (13) in a section of the longitudinal direction are covered by the columnar body portions.

16 Claims, 12 Drawing Sheets

U.S. PATENT DOCUMENTS

| | | | |
|---|---|---|---|
| 7,781,101 B2 * | 8/2010 | Okazaki et al. | 429/218.1 |
| 2006/0035155 A1 | 2/2006 | Tamura et al. | |
| 2006/0134518 A1 | 6/2006 | Kogetsu et al. | |

FOREIGN PATENT DOCUMENTS

| | | |
|---|---|---|
| CN | 1762065 A | 4/2006 |
| JP | 2002-170557 | 6/2002 |
| JP | 2002-279974 | 9/2002 |
| JP | 2002-313319 | 10/2002 |
| JP | 2003-17040 | 1/2003 |
| JP | 2005-196970 | 7/2005 |
| JP | 2006-196447 A | 7/2006 |
| JP | 2007-128659 * | 5/2007 |
| JP | 2007-172991 | 7/2007 |
| JP | 2007-194076 | 8/2007 |
| JP | 4038233 | 11/2007 |
| WO | WO 2007/052803 A1 | 5/2007 |
| WO | WO 2007-128659 | 5/2007 |
| WO | WO 2007/074654 A1 | 7/2007 |
| WO | WO 2007/094311 * | 8/2007 |

OTHER PUBLICATIONS

Chinese Office Action issued in Chinese Patent Application No. CN 2007800013565 dated Sep. 18, 2009.

* cited by examiner

Discharging

Charging

Discharging

Charging

Discharging

Charging

NEGATIVE ELECTRODE FOR NON-AQUEOUS ELECTROLYTE SECONDARY BATTERY, METHOD OF MANUFACTURING THE SAME, AND NON-AQUEOUS ELECTROLYTE SECONDARY BATTERY USING THE SAME

RELATED APPLICATIONS

This application is the U.S. National Phase under 35 U.S.C. §371 of International Application N$_o$. PCT/JP2007/071602, filed on Nov. 7, 2007, which in turn claims the benefit of Japanese Patent Application No. JP 2006-335409, filed on Dec. 13, 2006, the disclosures of which Applications are incorporated by reference herein.

TECHNICAL FIELD

The present invention relates to a non-aqueous electrolyte secondary battery with an excellent charging/discharging characteristic, and more particularly, to a negative electrode for a non-aqueous electrolyte secondary battery which is superior in a capacity retaining ratio, a high-rate characteristic or a low-temperature characteristic, a method of manufacturing the same, and a non-aqueous electrolyte secondary battery using the same.

BACKGROUND ART

A lithium-ion secondary battery which is representative of a non-aqueous electrolyte secondary battery has properties such as lightweight, high electromotive force and high-energy density. Accordingly, the lithium-ion secondary battery has been increasingly used as driving power sources of various types of portable electronic apparatuses or mobile communication apparatuses such as a mobile telephone, a digital camera, a video camera and a notebook type computer.

The lithium-ion secondary battery includes a positive electrode made of complex oxide containing lithium, a negative electrode including a lithium metal, a lithium alloy or a negative electrode active material inserting/extracting lithium ion, and an electrolyte.

Recently, instead of a carbon material, such as graphite, which has been conventionally used as a negative electrode material, research into an element having insertion property of a lithium ion and having a theoretical capacity density of more than 833 mAh/cm$^3$ has been reported. For example, as an element of a negative electrode active material having the theoretical capacity density of more than 833 mAh/cm$^3$, there is silicon (Si), tin (Sn) or germanium (Ge) which is alloyed with lithium, oxide or ally thereof. Among them, since silicon-containing particles such as Si particles or silicon oxide particles are cheap, they have been widely investigated.

However, the volumes of these elements are increased when lithium ions are inserted during charging. For example, if the negative electrode active material is Si, Li$_{4.4}$Si is obtained in a state in which a maximum amount of lithium ions is inserted. Since Si is changed to Li$_{4.4}$Si, the volume thereof is increased to 4.12 times of a discharging cycle.

Accordingly, if a thin film of the element is deposited on a current collector by a CVD method or a sputtering method so as to form a negative electrode active material, the negative electrode active material expands or contracts by inserting/extracting the lithium ion and peeling may occur due to deterioration of adhesion of the negative electrode active material and a negative electrode current collector in repeated charging/discharging cycle.

In order to solve the above-described problems, a method (for example, see Patent Document 1) of forming irregularities in the surface of a current collector, depositing a negative electrode active material thin film thereon, and forming a space in a thickness direction by etching was disclosed. In addition, a method of providing a mesh on a current collector, depositing a negative electrode active material thin film through the mesh, and suppressing the deposition of the negative electrode active material in a region corresponding to a frame of the mesh was suggested (for example, see Patent Document 2).

In addition, a method of forming irregularities on the surface of a current collector and obliquely forming a thin-film-shaped negative electrode material with respect to a surface perpendicular to a main surface of the negative electrode material was suggested (for example, see Patent Document 3).

In the secondary battery disclosed in Patent Document 1 or Patent Document 2, the negative electrode active material thin film is formed in a columnar shape and the space is formed between the columnar, thereby preventing peeling or wrinkles. However, since the negative electrode active material contracts in the start of charging, a metal surface of the current collector may be exposed through the space. Accordingly, since the exposed current collector faces a positive electrode during charging, lithium metal is susceptible to be precipitated and thus stability or capacity may deteriorate. In order to increase the capacity of the battery, if the height of the negative electrode active material having the columnar shape is increased or the interval between the spaces is decreased, a front end (an opening side) of the negative electrode active material having the columnar shape is restricted by the current collector and thus, as the charging progresses, the negative electrode active material significantly expands compared with the vicinity of the current collector. As a result, the negative electrode active materials having the columnar shape are brought into contact with each other in the vicinity of the front end thereof and thus the current collector and the negative electrode active material are peeled or wrinkles are generated in the current collector due to pushing. Accordingly, it is impossible to simultaneously realize high capacity and the prevention of the peeling of the current collector and the negative electrode active material or the generation of the wrinkles in the current collector. In addition, since an electrolyte is filled in the space between the columnar-shaped negative electrode active materials which expand and contact with each other, the movement of the lithium ions at the beginning of discharge is blocked and, more particularly, a high-rate discharging or a discharging characteristic in a low-temperature environment is problematic.

In the structure disclosed in Patent Document 3, as shown in FIG. 13A, it is possible to prevent current collector 551 from being exposed and prevent the lithium metal from being precipitated, by negative electrode active material 553 formed obliquely θ. However, similar to Patent Documents 1 and 2, as shown in FIG. 13B, since negative electrode active material 553 significantly expands as the charging progresses compared with the vicinity of current collector 551, the negative electrode active materials having the columnar shape are brought into contact with each other in the vicinity of the front end thereof and thus current collector 551 and negative electrode active material 553 are peeled or wrinkles are generated in current collector 551 due to pushing, as denoted by an arrow of the drawing. In addition, since the negative electrode active material is obliquely formed, the negative electrode active material is formed on only two surfaces of a longitudinal direction of a protruding portion of the current collector.

Accordingly, stress due to the expansion/contraction of the negative electrode active material in charging/discharging cycle should be lessened by the negative electrode active material covering the two surface of the protruding portion. As a result, as the charging/discharging cycle progresses, the negative electrode active material is susceptible to be peeled from the surface of the protruding portion by the stress and reliability deteriorates. In addition, since an electrolyte is filled in space 555 between the columnar-shaped negative electrode active materials which expand and contact with each other, the movement of the lithium ions at the beginning of discharge is blocked and, more particularly, a high-rate discharging or a discharging characteristic in a low-temperature environment is problematic.

[Patent Document 1] Japanese Patent Unexamined Publication No. 2003-17040
[Patent Document 2] Japanese Patent Unexamined Publication No. 2002-279974
[Patent Document 3] Japanese Patent Unexamined Publication No. 2005-196970

DISCLOSURE OF THE INVENTION

According to an aspect of the present invention, there is provided a negative electrode for a non-aqueous electrolyte secondary battery, which reversibly inserts/extracts lithium ions, the negative electrode comprising: a current collector in which a non-protruding portion and a protruding portion are formed at least one surface thereof and a columnar body which is formed by laminating n (n≧1.2) stages of columnar body portions which are obliquely erected on the protruding portion of the current collector and in which a content ratio of elements sequentially varies in a longitudinal direction of the current collector, and which has a configuration in which variation directions of content ratios of elements of odd-numbered stages of columnar body portions and even-numbered stages of stages of columnar body portions are different from each other, wherein at least three surfaces of the protruding portion in a section of the longitudinal direction are covered by the columnar body portions.

By this configuration, it is possible to realize the negative electrode for the non-aqueous electrolyte secondary battery, which is capable of improving peeling strength of the columnar body and the protruding portion, realizing high capacity while maintaining a space between the columnar bodies, and remarkably improving a high-rate discharging or low-temperature characteristic during discharging with long life span.

According to another aspect of the present invention, there is provided a method of manufacturing a negative electrode for a non-aqueous electrolyte secondary battery which reversibly inserts/extracts lithium ions, the method comprising: a first step of forming a non-protruding portion and a protruding portion on at least one surface of a current collector; a second step of forming a first stage of columnar body portion, which is obliquely erected, on the protruding portion so as to cover at least two surfaces of the protruding portion in a section of a longitudinal direction of the protruding portion; and a third step of forming a second columnar body portion, which is obliquely erected in a direction different from that of the first stage of columnar body portion, on the first stage of columnar body portion so as to cover one remaining surface in the section of the longitudinal direction of the protruding portion.

By this configuration, it is possible to readily manufacture the negative electrode for the non-aqueous electrolyte secondary battery, which is capable of improving peeling strength of the columnar body and the protruding portion and preventing wrinkles in the current collector while maintaining a space between the columnar bodies, with high reliability.

According to another aspect of the present invention, there is a non-aqueous electrolyte secondary battery comprising, the negative electrode for the non-aqueous electrolyte secondary battery, a positive electrode which reversibly inserts/extracts the lithium ions, and a non-aqueous electrolyte. By this configuration, it is possible to realize the non-aqueous electrolyte secondary battery with high stability and high reliability.

Figure 1:
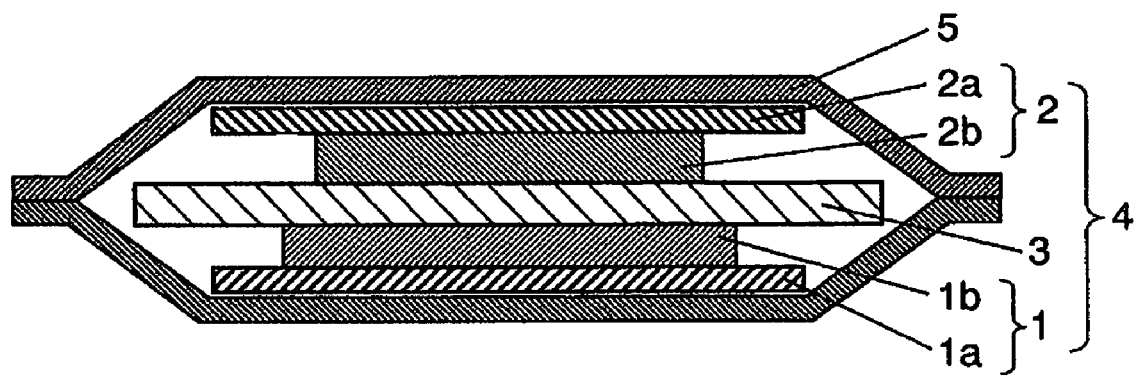
FIG. 1 is a cross-sectional view showing a non-aqueous electrolyte secondary battery in accordance with a first exemplary embodiment of the present invention.

REFERENCE MARKS IN THE DRAWINGS 1, 20, 51, 71: negative electrode
1a, 11, 61, 81: current collector (negative electrode current collector)
1b, 15, 65, 85: columnar body
2, 17: positive electrode
2a: positive electrode current collector
2b: positive electrode mixture layer
3: separator
4: electrode group
5: armored case
12, 62, 82: non-protruding portion
13, 63, 83: protruding portion
13a, 13b, 13c, 63a, 63b, 63c, 83a, 83b, 83c: surface
15a: lower side
15b: upper side
18: electrolyte (non-aqueous electrolyte)
40: manufacturing apparatus
41: vacuum chamber
42: gas introduction pipe
43: fixing stand
45: nozzle
46: deposition source
47: vacuum pump
65a, 152a: base portion
65b: constricted portion
85c: covering layer
151: first columnar body portion
152: second columnar body portion
153: third columnar body portion

DETAILED DESCRIPTION OF THE PREFERRED EMBODIMENTS

Hereinafter, the exemplary embodiments of the present invention will be described with reference to the accompanying drawings, in which like portions are denoted by like reference numerals. The present invention is implemented on the basis of basic features described in the present specification but is not limited to the following contents.

First Exemplary Embodiment

FIG. 1 is a cross-sectional view showing a non-aqueous electrolyte secondary battery in accordance with a first exemplary embodiment of the present invention. As shown in FIG. 1, a lamination type non-aqueous electrolyte secondary battery (hereinafter referred to as "battery") includes electrode group 4 including negative electrode 1, positive electrode 2 which faces negative electrode 1 and reduces lithium ions during discharging, and porous separator 3 which is interposed between negative electrode 1 and positive electrode 2 for preventing direct contact of the negative electrode and the positive electrode. Electrode group 4 and a non-aqueous electrolyte (not shown) having lithium ion conductivity are accommodated in armored case 5. The non-aqueous electrolyte having the lithium ion conductivity is impregnated in separator 3. One ends of a positive electrode lead (not shown) and a negative electrode lead (not shown) are respectively connected to positive electrode current collector 2a and negative electrode current collector 1a and the other ends thereof are led to the outside of armored case 5. An opening of armored case 5 is sealed by a resin material. Positive electrode 2 includes positive electrode current collector 2a and positive electrode mixture layer 2b supported by positive electrode current collector 2a.

As described below in detail, negative electrode 1 includes negative electrode current collector 1a (hereinafter, referred to as "current collector") having a non-protruding portion and a protruding portion and zigzag columnar body 1b in which n ($n \geqq 2$) stages of columnar body portions erected obliquely are laminated so as to cover at least three surfaces in a longitudinal-direction section of a protrusion portion of the protruding portion. The columnar body portions are formed by sequentially changing a content ratio of elements configuring them in a longitudinal direction of a protruding portion of the current collector. In addition, the laminated n ($n \geqq 2$) stages of columnar body portions are formed such that odd-numbered stages of columnar body portion and even-numbered stages of columnar body portion are different from each other in the change direction of the content ratio of the elements.

The three surfaces of the protruding portion indicate three surfaces including an upper surface of the protruding portion and side surfaces of the protruding portion when the protrusion portion of the protruding portion is cut in the longitudinal direction. In more detail, for example, if the protruding portion has a rectangular parallelepiped, the protruding portion has total five surfaces including the upper surface of the protruding portion and the side surfaces of the protruding portion excluding a bottom surface of the protruding portion. Accordingly, the surfaces covered by a first stage of columnar body portion become the upper surface of the protruding portion and one surface or two surfaces of the side surfaces of the protruding portion. Here, if the columnar body portion is formed in a direction perpendicular to the side surfaces of the protruding portion, the covered surface becomes one surface and, if not perpendicular, the covered surface becomes two surfaces. The surfaces covered by a second columnar body portion become at least one surface of the three remaining surfaces when the first stage of columnar body portion covers one surface of the side surfaces of the protruding portion. In addition when the first stage of columnar body portion covers two surfaces of the side surfaces of the protruding portion, the second columnar body portion are formed on the two remaining surfaces. In addition, if the shape of the protruding portion is elliptic or cylindrical when viewing the protruding portion from the upper surface, the formation surfaces of the columnar body portion become the upper surface and the side surface of the protruding portion. The surfaces covered by the first stage of columnar body portion become a portion of the upper surface of the side surface of the protruding portion.

The surfaces covered by the second columnar body portion become a portion of the remaining side surfaces of the protruding portion.

Here, positive electrode mixture layer 2b includes complex oxide containing lithium such as $LiCoO_2$, $LiNiO_2$, $Li_2MnO_4$, or a mixture or complex compound thereof as the positive electrode active material. As the positive electrode active material, in addition to the above, olivine-type lithium phosphate expressed by a general formula of $LiMPO_4$ (M=V, Fe, Ni, Mn) or lithium fluorophosphates expressed by a general formula of $Li_2MPO_4F$ (M=V, Fe, Ni, Mn) may be used. A portion of the compound containing lithium may be replaced with a heteroelement. Surface treatment may be made by metal oxide, lithium oxide or a conductive agent or surface hydrophobic may be made.

Positive electrode mixture layer 2b further includes a conductive agent and a binder. As the conductive agent, graphite such as natural graphite or artificial graphite, carbon black such as acetylene black, Ketchen black, channel black, furnace black, lamp black or thermal black, conductive fibers such as carbon fiber or metal fiber, metal powder such as carbon fluoride or aluminum, conductive whisker such as zinc oxide or potassium titanate, conductive metal oxide such as titanium oxide, or an organic conductive material such as phenylene derivative may be used.

As the binder, for example, PVDF, polytetrafluoroethylene, polyethylene, polypropylene, aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyether sulfone, hexafluoropolypropylene, styrene-butadiene rubber, or carboxymethyl cellulose may be used. In addition, a copolymer of at least two selected from tetrafluoroethylene, hexafluoroethylene, hexafluoropropylene, perfluoroalkylvinyl ether, vinylidene fluoride, chlorotrifluoroethylene, ethylene, propylene, pentafluoropropylene, fluoromethyl vinyl ether, acrylic acid, and hexadiene may be used. A mixture of at least two selected therefrom may be used.

As positive electrode current collector 2a used in positive electrode 2, aluminum (Al), carbon or conductive resin may be used. One of these materials may be subjected to surface treatment by carbon.

In the non-aqueous electrolyte, an electrolyte solution in which a solute is dissolved in an organic solvent or so-called polymer electrolyte layer which includes them and is non-fluidized with a polymer is applicable. If at least the electrolyte solution is used, the electrolyte solution is preferably impregnated using separator 3 such as nonwoven fabric made of polyethylene, polypropylene, aramid resin, amideimide, polyphenylene sulfide or polyimide or microporous membrane between positive electrode 2 and negative electrode 1. Heat-resistant filler such as alumina, magnesia, silica or titania may be contained in separator 3 or in the surface of the separator. In additional to separator 3, a heat resistant layer made of the filler and the same binder as that used in positive electrode 2 and negative electrode 1 may be provided.

The non-aqueous electrolyte material is selected on the basis of an oxidation reduction potential of the active material. As the preferable solute used in the non-aqueous electrolyte, salt which is generally used in the lithium battery, such as $LiPF_6$, $LiBF_4$, $LiClO_4$, $LiAlCl_4$, $LiSbF_5$, $LiSCN$, $LiCF_3SO_3$, $LiNCF_3CO_2$, $LiAsF_6$, $LiB_{10}Cl_{10}$, lower aliphatic lithium carboxylate, LiF, LiCl, LiBr, LiI, borides such as chloroborane lithium, bis(1,2-benzene diolate(2-)-O,O') lithium borate, bis (2,3-naphthalene diolate (2-)-O,O') lithium borate, bis(2,2'-biphenyl diolate(2-)-O,O') lithium borate, bis(5-fluoro-2-olate-1-benzenesulfonic acid-O,O') lithium borate, $(CF_3SO_2)_2$ NLi, $LiN(CF_3SO_2)(C_4F_3SO_2)$, $(C_2F_5SO_2)_2NLi$, or tetraphenyl lithium borate, may be used.

As the organic solvent for dissolving the salt, a mixture of at least one ethylene carbonate (EC), propylene carbonate, butylene carbonate, vinylene carbonate, dimethylene carbonate (DMC), diethyl carbonate, ethylmethyl carbonate (EMC), dipropyl carbonate, methyl formate, methyl acetate, methyl propionate, ethyl propionate, dimethoxymethane, γ-butyrolactone, γ-valerolactone, 1,2-diethoxyethane, 1,2-dimethoxyethane, ethoxymethoxyethane, trimethoxymethane, tetrahydrofuran derivative such as tetrahydrofuran or 2-methyltetrahydrofuran, dioxolan derivative such as dimethylsulfoxide, 1,3-dioxolan, 4-methyl-1,3-dioxolan, formamide, acetamide, dimethylformamide, acetonitrile, propylnitrile, nitromethane, ethylmonoglyme, phosphate triester, acetate ester, propionate ester, sulfolane, 3-methylsulfolane, 1,3-dimethyl-2-imidazolidinone, 3-methyl-2-oxazolidinone, propylene carbonate derivative, ethyl ether, diethyl ether, 1,3-propane sultone, anisole, fluorobenzene may be applied to the solvent which is generally used in the lithium battery.

In addition, an additive such as vinylene carbonate, cyclohexylbenzene, biphenyl, diphenyl ether, vinyl ethylene carbonate, divinyl ethylene carbonate, phenyl ethylene carbonate, diaryl carbonate, fluoroethylene carbonate, catechol carbonate, vinyl acetate, ethylene sulfide, propane sultone, trifluoropropylene carbonate, dibenzofuran, 2,4-difluoroanisole, o-terphenyl, or m-terphenyl may be contained.

The non-aqueous electrolyte may be used as a solid electrolyte by mixing the solute with a mixture of at least one of a polymer material such as polyethylene oxide, polypropylene oxide, polyphosphazene, polyaziridine polyethylene sulfide, polyvinyl alcohol, polyvinylidene-fluoride, polyhexafluoropropylene. In addition, the non-aqueous electrolyte may be mixed with the organic solvent so as to be used in a gel shape. An inorganic material such as lithium nitride, lithium halide, lithium oxyacid salt, $Li_4SiO_4$, $Li_4SiO_4$—LiI—LiOH, $Li_3PO_4$—$Li_4SiO_4$, $Li_2SiS_3$, $Li_3PO_4$—$Li_2S$—$SiS_2$, or phosphorus sulfide compound may be used as the solid electrolyte. If the gel non-aqueous electrolyte is used, the gel non-aqueous electrolyte may be interposed between negative electrode 1 and positive electrode 2 instead of separator 3. Alternatively, the gel non-aqueous electrolyte may be provided adjacent to separator 3.

As current collector 1a of negative electrode 1, a metal foil such as stainless steel, nickel, copper, titanium or a thin film of carbon or conductive resin may be used. Surface treatment may be made by carbon, nickel or titanium.

As the columnar body portion configuring columnar body 1b of negative electrode 1, an active material which reversibly inserts/extracts lithium ions such as silicon (Si) or tin (Sn) and has theoretical capacity density of more than 833 $mAh/cm^3$ may be used. If this active material is used, any one of elementary substance, an alloy, a compound, a solid solution and a complex active material including a silicon containing material or a tin containing material may be used and the effect of the present invention can be obtained. That is, as the silicon containing material, Si, SiOx ($0<x\leq2.0$) an alloy or compound in which a portion of Si is substituted with at least one element selected from a group including Al, In, Cd, Bi, Sb, B, Mg, Ni, Ti, Mo, Co, Ca, Cr, Cu, Fe, Mn, Nb, Ta, V, W, Zn, C, N, and Sn, or a solid solution may be used. As the tin containing material, $Ni_2Sn_4$, $Mg_2Sn$, SnOx ($0<x<2.0$), $SnO_2$, $SnSiO_3$, or LiSnO may be used.

The columnar body portion may be a single active material or may be configured by a plurality of active materials. As an example in which the columnar body portion is configured by the plurality of active materials, there are a compound containing Si, oxygen and nitrogen and a plurality of compounds containing Si and oxygen and different configuration ratios of Si and oxygen.

Hereinafter, the negative electrode for the non-aqueous electrolyte secondary battery (which hereinafter may be referred to as "negative electrode") in accordance with the first exemplary embodiment of the present invention will be described in detail with reference to FIGS. 2A, 2B, 3A and 3B. Hereinafter, for example, a negative electrode active material (hereinafter, referred to as "active material") expressed by SiOx ($0 \leq x \leq 2.0$) containing at least silicon will be described.

Figure 2A:
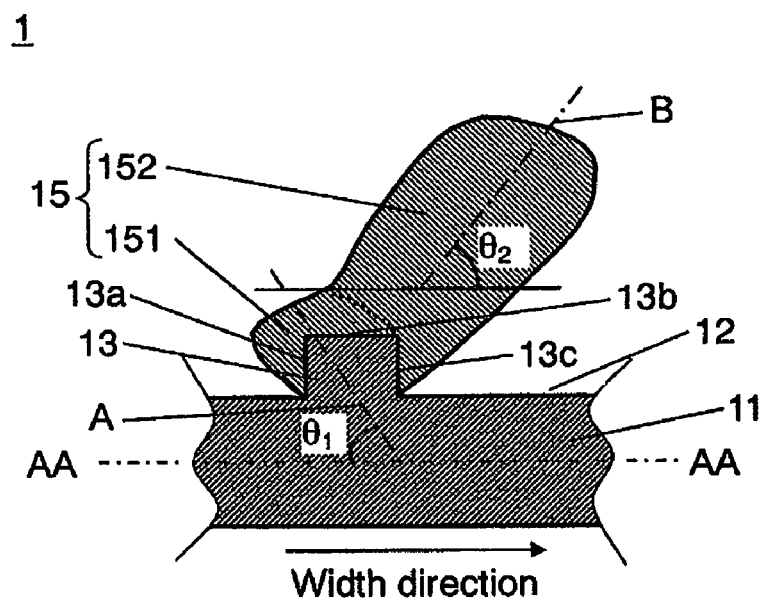
FIG. 2A is a partial cross-sectional view showing the structure of a negative electrode in accordance with the first exemplary embodiment of the present invention.
Figure 2B:
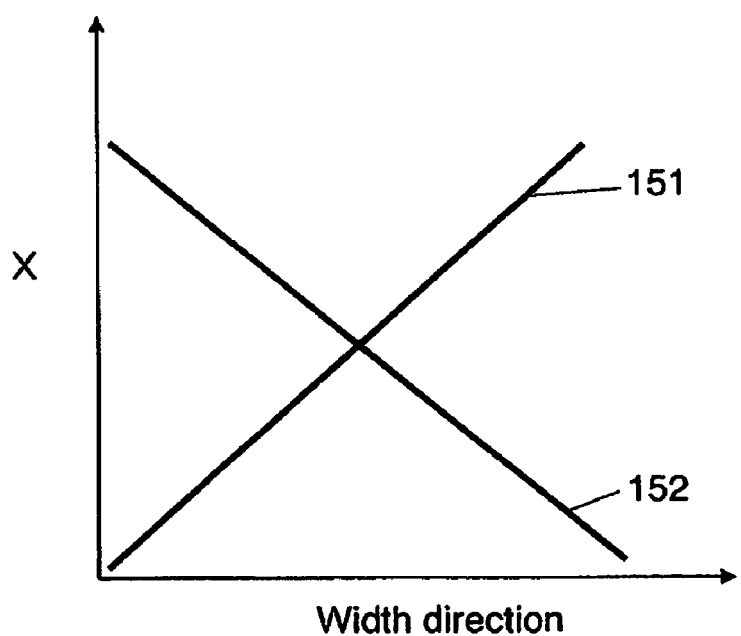
FIG. 2B is a schematic view explaining a variation in value of x in a width direction of an active material in accordance with the same embodiment.

FIG. 2A is a partial cross-sectional view showing the structure of the negative electrode in accordance with the first exemplary embodiment of the present invention. FIG. 2B is a schematic view explaining a variation in value of x in a width direction of an active material in accordance with the same embodiment.

As shown in FIG. 2A, for example, non-protruding portion 12 and protruding portion 13 are provided on at least an upper surface of current collector 11 made of a conductive metal material such as a copper (Cu) foil. On protruding portion 13, the active material which configures negative electrode 1 and is expressed by SiOx is formed in the shape of columnar body 15 which is obliquely erected by an oblique vapor-deposition method using a sputtering method or a vacuum vapor-deposition method and includes n ($n \geq 2$) stages of columnar body portions. At this time, columnar body 15 covering at least three surfaces 13a, 13b and 13c of the protrusion portion in the longitudinal-direction section of protruding portion 13 of current collector 11 by n=2 stages and including first columnar body portion 151 and second columnar body portion 152 is formed. Here, the three surfaces in the longitudinal-direction section of protruding portion 13 vary according to the shape of the protruding portion or the angle of the protruding portion surface in a direction in which the active material flies, as described above. Although, hereinafter, the case where the shape of the protruding portion is a rectangular parallelepiped, the direction in which the active material flies is perpendicular to the side surfaces of the protruding portion, and the columnar body portion is formed by the upper surface and two side surfaces of four side surfaces of the protruding portion is described, the present invention is not limited thereto. Although, hereinafter, columnar body 15 configured by laminating first columnar body portion 151 and second columnar body portion 152 by the n=2 stages is described, the present invention is not limited thereto if three surfaces 13a, 13b and 13c of the protrusion portion of protruding portion 13 of current collector 11 by the n≧2 stages are covered. Surface 13b of protruding portion 13 corresponds to the upper surface of the protruding portion and surfaces 13a and 13c correspond to at least two surfaces of the side surfaces of the protruding portion.

First, first columnar body portion 151 of columnar body 15 is formed so as to form an intersection angle (hereinafter, referred to as "obliquely erected angle") $\theta_1$ between a central line A in an obliquely erected direction of first columnar body portion 151 and a central line AA-AA in a thickness direction of current collector 11 on at least protruding portion 13 of current collector 11. Second columnar body portion 152 of columnar body 15 is formed so as to form an obliquely erected angle $\theta_2$ between a central line B in an obliquely erected direction thereof and the central line AA-AA in the thickness direction of current collector 11 on first columnar body portion 151.

At this time, first columnar body portion 151 covers at least two surfaces 13a and 13b in the longitudinal direction of protruding portion 13 of current collector 11. In addition, when second columnar body portion 152 is formed, first columnar body portion 151 is formed with a height in which second columnar body portion 152 can cover surface 13c of protruding portion 13. For example, the height (thickness) of first columnar body portion 151 indicates the height in which incident evaporating particles such as Si reach surface 13c of protruding portion 13 when second columnar body portion 152 is formed, and is determined by the shape or the interval of non-protruding portion 12 or protruding portion 13 of current collector 11 and the incident angle of the evaporating particles.

The height of second columnar body portion 152 is not restricted unlike first columnar body portion 151 and may be arbitrarily set in consideration of the design capacity of the battery if adjacent columnar bodies are not in contact with each other. Similarly, the obliquely erected angles $\theta_1$ and $\theta_2$ may be equal to or different from each other if the adjacent columnar bodies 15 are not brought into contact with each other by expansion/contraction at the time of insertion/extraction of the lithium ions.

Here, first columnar body portion 151 and second columnar body portion 152 configuring columnar body 15 are provided such that the content ratios of the elements of the width direction of first columnar body portion 151 and second columnar body portion 152 made of SiOx, for example, the variation directions of the value of x, are different from each other, as shown in FIG. 2B. That is, the value of x is sequentially increased from an obliquely erected angle side forming an acute angle of first columnar body portion 151 and second columnar body portion 152 to the side forming an obtuse angle. The value of x linearly varies in FIG. 2B, but the present invention is not limited thereto.

Hereinafter, the operation of the non-aqueous electrolyte secondary battery configured using the negative electrode for the non-aqueous electrolyte secondary battery in accordance with the first exemplary embodiment of the present invention during charging/discharging will be described with reference to FIGS. 3A and 3B.

Figure 3A:
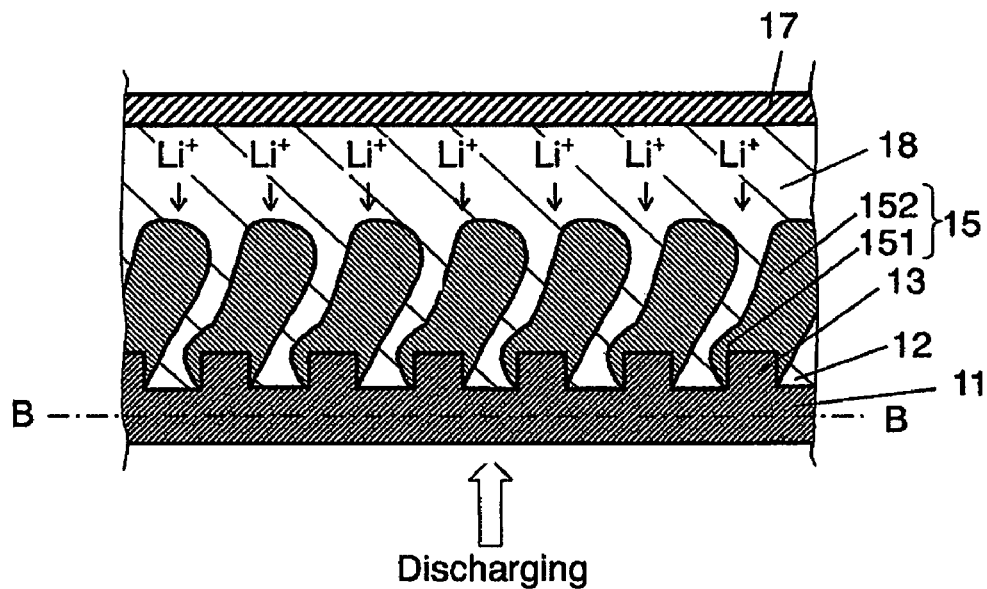
FIG. 3A is a partial cross-sectional view showing a state before charging the non-aqueous electrolyte secondary battery in accordance with the first exemplary embodiment of the present invention.

FIG. 3A is a partial cross-sectional view showing a state before charging the non-aqueous electrolyte secondary battery in accordance with the first exemplary embodiment of the present invention. FIG. 3B is a partial cross-sectional view showing a state after charging the non-aqueous electrolyte secondary battery in accordance with the same embodiment.

The volume of columnar body 15 which is obliquely erected on protruding portion 13 of current collector 11 and is formed of n=2 stages of columnar body portions expands by the insertion of the lithium ions at the time of charging the non-aqueous electrolyte secondary battery. At this time, as the volume expands, the obliquely erected angles $\theta_1$ and $\theta_2$ of first columnar body portion 151 and second columnar body portion 152 of columnar body 15 shown in FIG. 2A are increased and, as a result, columnar body 15 is deformed so as to be straightly erected as shown in FIG. 3B. In contrast, during discharging, by the extraction of the lithium ions, as shown in FIG. 3A, the volume contracts and the obliquely erected angles $\theta_1$ and $\theta_2$ shown in FIG. 2A are decreased. Thus, columnar body 15 becomes an initial state.

Here, as shown in FIG. 3A, in the start of charging, since columnar body 15 including the n=2 stages of first columnar body portion 151 and second columnar body portion 152 is obliquely erected on protruding portion 13 of current collector 11, when columnar body 15 is viewed from positive electrode 17, non-protruding portion 12 of current collector 11 is partially shielded from positive electrode 17 by columnar body 15. Accordingly, the lithium ions extracted from positive electrode 17 during charging are prevented from reaching non-protruding portion 12 of current collector 11 by columnar body 15 of the negative electrode and most of the lithium ions are inserted to columnar body 15. Thus, it is possible to suppress precipitation of lithium metal. In addition, the obliquely erected angles of first columnar body portion 151 and second columnar body portion 152 are increased by the insertion of the lithium ions and, as a result, columnar body 15 is substantially erected with respect to current collector 11. The columnar body is not necessarily erected and may have a zigzag shape by an obliquely erected angle of 90° or less and more preferably 90° due to the design factors such as the number or the obliquely erected angle of stage of columnar body portions.

Figure 3B:
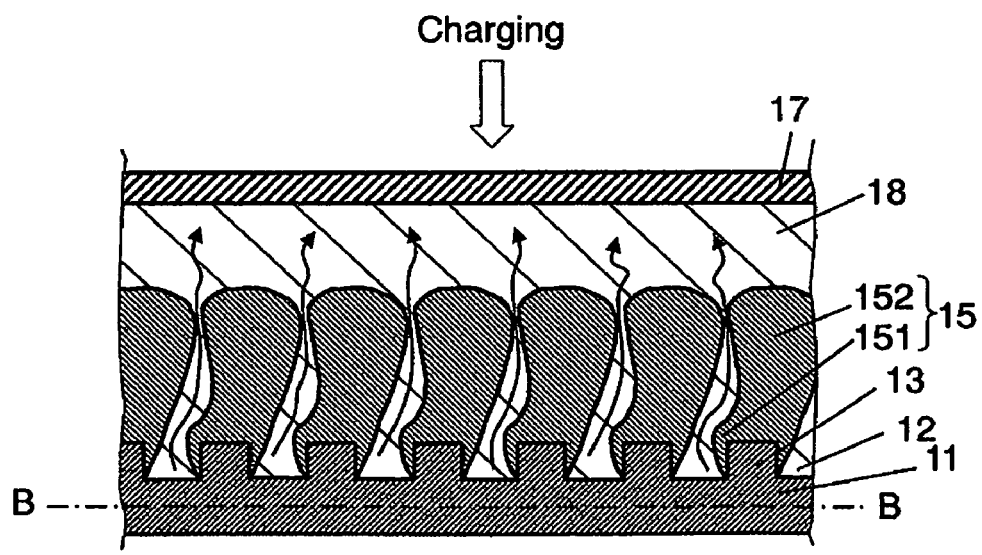
FIG. 3B is a partial cross-sectional view showing a state after charging the non-aqueous electrolyte secondary battery in accordance with the same embodiment.

As shown in FIG. 3B, if the battery charged completely is discharged, columnar body 15 formed of the columnar body portions, which expand by charging, is erected with respect to current collector 11. Accordingly, electrolyte 18 between adjacent columnar bodies 15 can readily be moved between columnar bodies 15 as denoted by an arrow of the drawing. In addition, since electrolyte 18 between the columnar bodies 15 can readily convect through the space between columnar bodies 15, the movement of the lithium ions is not blocked. Since columnar body 15 is straightly erected, the movement distance of electrolyte 18 is decreased compared with the case where the columnar body is obliquely erected at the start of charging. Accordingly, the lithium ions can be linearly moved. As a result, it is possible to remarkably improve a high-rate discharging characteristic or a low-temperature discharging characteristic.

Hereinafter, a mechanism in which the obliquely erected angle of columnar body 15 reversibly varies according to the insertion/extraction of the lithium ions will be described with reference to FIGS. 4A and 4B.

In the present invention, the columnar body includes n (n≧2) stages of columnar body portions and the three surfaces of the protruding portion of the current collector are covered by at least two columnar body portions. However, in order to simplify the description, in FIGS. 4A and 4B, for example, the columnar body including one columnar body portion covering at least the two surfaces of the protruding portion of the current collector will be described. The same mechanism is obtained even in the configuration including n stages.

Figure 4A:
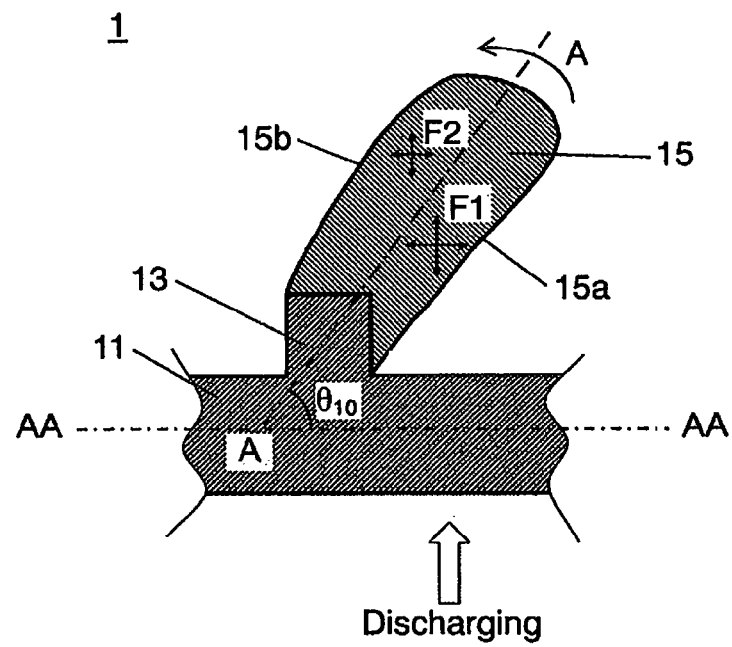
FIG. 4A is a partial cross-sectional view showing a state before charging a columnar body of the negative electrode in accordance with the first exemplary embodiment of the present invention.

FIG. 4A is a partial cross-sectional view showing a state before charging a columnar body of the negative electrode in accordance with the first exemplary embodiment of the present invention. FIG. 4B is a partial cross-sectional view showing a state after charging the columnar body of the negative electrode in accordance with the same embodiment.

Figure 4B:
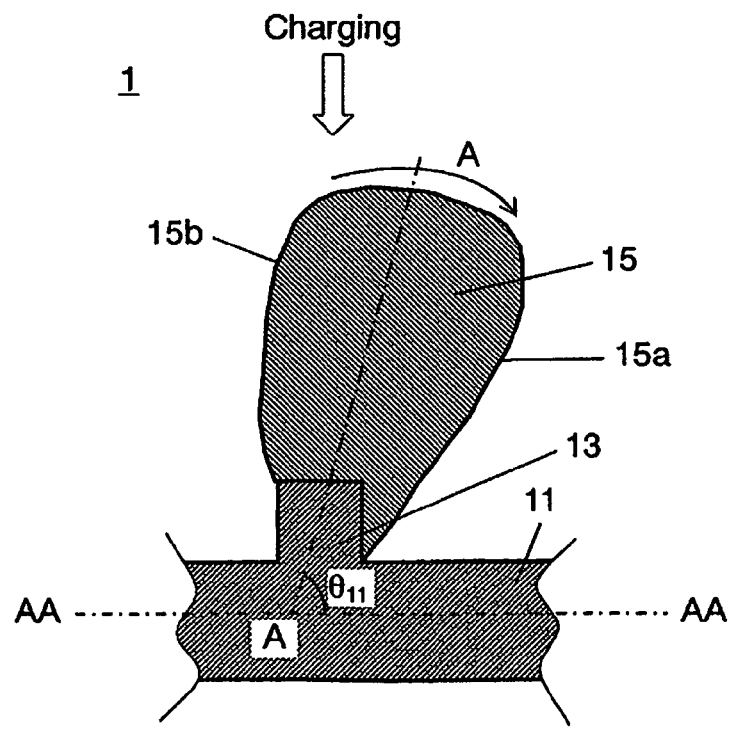
FIG. 4B is a partial cross-sectional view showing a state after charging the columnar body of the negative electrode in accordance with the same embodiment.

In columnar body 15 shown in FIGS. 4A and 4B, the content ratio of the elements of the active material made of SiOx varies such that the value of x is continuously increased from lower side 15a forming the acute angle between the central line A-A of columnar body 15 and the central line AA-AA of current collector 11 to upper side 15b forming the obtuse angle of columnar body 15. As the value of x is increased from 0 to 2, the expansion amount of the active material formed of SiOx due to the insertion of the lithium ions is decreased.

That is, as shown in FIG. 4A, expansion stress which is generated by the expansion due to the insertion of the lithium ions during charging is continuously decreased from expansion stress F1 of lower side 15a of columnar body 15 to expansion stress F2 of upper side 15b. As a result, the obliquely erected angle θ between the central line A-A of columnar body 15 and the central line AA-AA of current collector 11 varies from $\theta_{10}$ to $\theta_{11}$ and columnar body 15 is straightly erected in a direction denoted by an arrow of FIG. 4A. In contrast, the expansion stress is decreased by the contraction due to the extraction of the lithium ions during discharging. As a result, the obliquely erected angle θ of columnar body 15 varies from $\theta_{11}$ to $\theta_{10}$ and columnar body 15 is deformed in a direction denoted by an arrow of FIG. 4B.

Accordingly, the obliquely erected angle of columnar body 15 reversibly varies by the insertion/extraction of the lithium ions.

However, in the case where the amounts of active materials which can insert/extract the lithium ions in positive electrode 2 and negative electrode 1 are equal, if the columnar body of negative electrode 1 is configured by one columnar body portion erected obliquely, only two surfaces of protruding portion 13 of current collector 11 are covered. Accordingly, as a charging/discharging cycle progresses, large stress is generated in an interface between the protruding portion and the columnar body by the expansion/contraction of the columnar body, columnar body 15 is peeled from protruding portion 13 of current collector 11 and thus reliability deteriorates. If the columnar body is formed of one columnar body portion, the front end of the columnar body significantly expands by the insertion of the lithium ions and thus adjacent columnar bodies are brought into contact with each other. Thus, larger stress may be applied to the columnar body and the protruding portion of the current collector.

Accordingly, in the present exemplary embodiment, the three surfaces of the protruding portion of the current collector are covered by the first columnar body portion and the second columnar body portion having different obliquely erected directions so as to increase the adhesion area of the columnar body. Thus, adhesion strength is increased and peeling can be prevented.

Since the columnar body is configured by laminating at least n=2 stages of columnar body portions, even in the case where the amounts of active materials capable of inserting/extracting the lithium ions are equal, the height (thickness) of each columnar body portion can be decreased. As a result, the expansion amount of the front end of each columnar body portion is decreased compared with the case of using one columnar body. That is, since the space due to the interval between adjacent columnar bodies is unlikely to be decreased by the expansion of the columnar body, it is difficult to push the columnar bodies to each other. Accordingly, since the allowable amount of the expansion of the columnar body can be remarkable increased, more lithium ions can be inserted and thus the capacity of the battery can be improved.

Although the columnar bodies expand, the space between adjacent columnar bodies can be kept large by the columnar body including the n stages of columnar body portions. Since the adjacent columnar bodies are not brought into contact with each other, it is possible to prevent stress due to the contact to the current collector from being generated and wrinkles or peeling by the stress can be prevented in advance. Accordingly, it is possible to realize the non-aqueous electrolyte secondary battery with an excellent charging/discharging cycle characteristic.

According to the present exemplary embodiment, it is possible to manufacture a non-aqueous electrolyte secondary battery which is superior in a capacity retaining ratio, a high-rate characteristic or a low-temperature characteristic while realizing high capacity.

Hereinafter, a method of manufacturing the columnar body of the negative electrode for the non-aqueous electrolyte secondary battery in accordance with the first exemplary embodiment of the present invention will be described with reference to FIGS. 5A to 5C and FIG. 6.

Figure 5A:
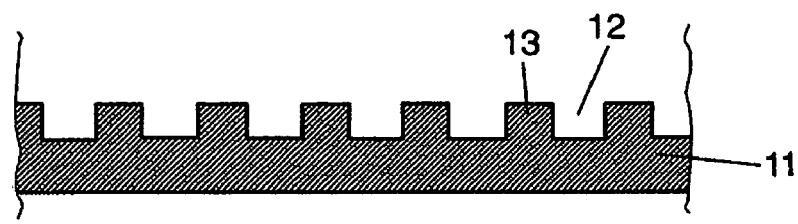
FIG. 5A is a partial cross-sectional view explaining a method of forming the columnar body formed of n stages of columnar body portions of the negative electrode for the non-aqueous electrolyte secondary battery in accordance with the first exemplary embodiment of the present invention.
Figure 5B:
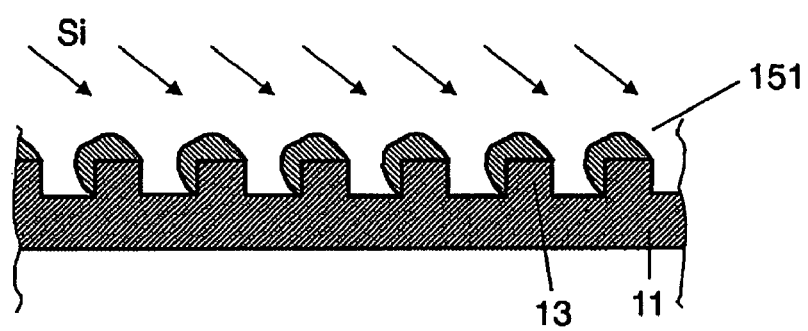
FIG. 5B is a partial cross-sectional view explaining the method of forming the columnar body formed of the n stages of columnar body portions of the negative electrode for the non-aqueous electrolyte secondary battery in accordance with the first exemplary embodiment of the present invention.
Figure 5C:
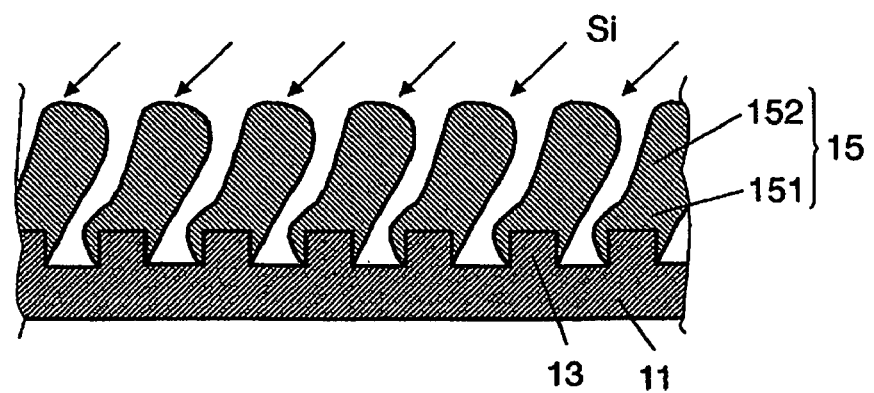
FIG. 5C is a partial cross-sectional view explaining the method of forming the columnar body formed of the n stages of columnar body portions of the negative electrode for the non-aqueous electrolyte secondary battery in accordance with the first exemplary embodiment of the present invention.
Figure 6:
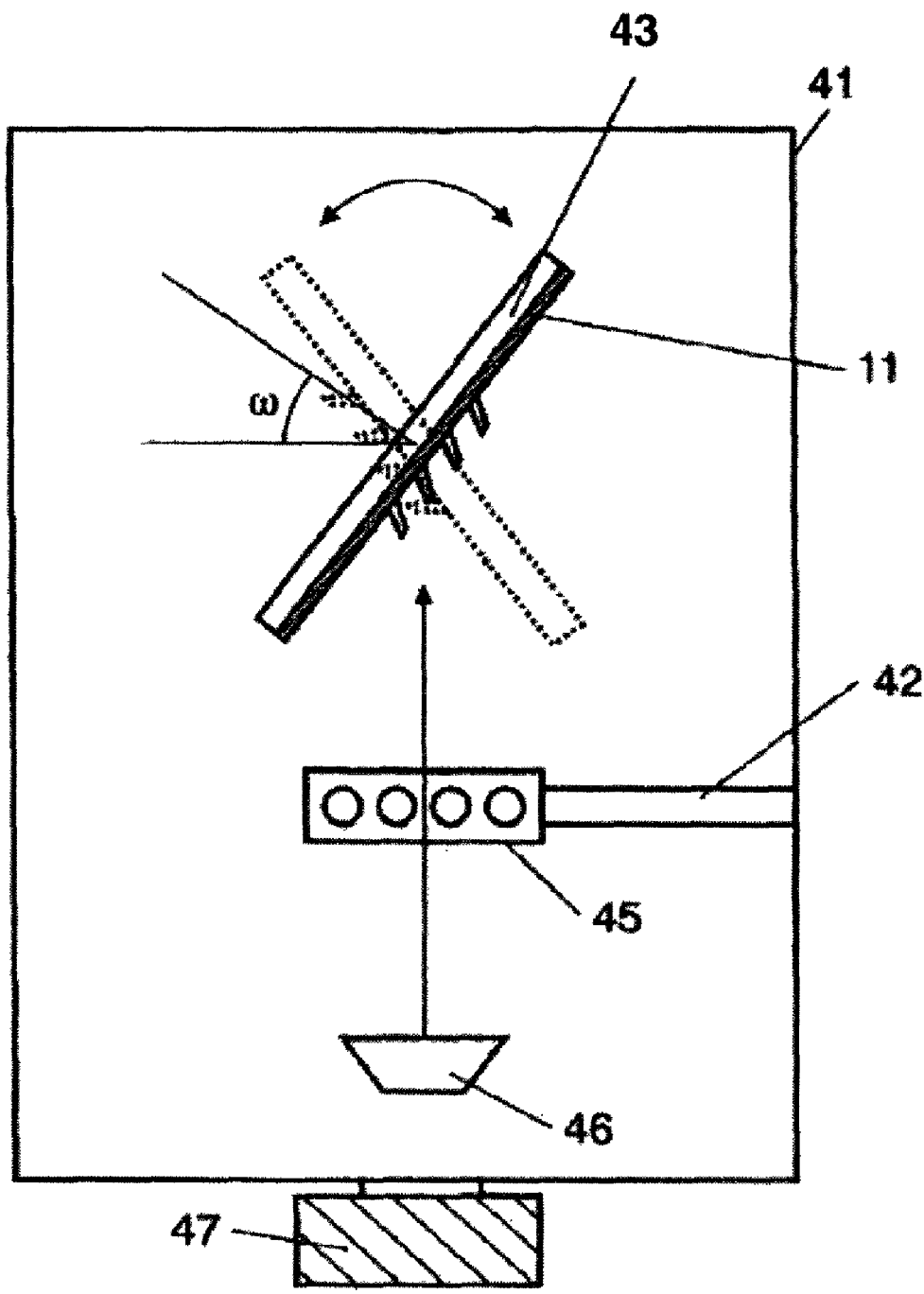
FIG. 6 is a schematic view showing an apparatus for manufacturing the columnar body formed of the n stages of columnar body portions of the negative electrode for the non-aqueous electrolyte secondary battery in accordance with the first exemplary embodiment of the present invention.

FIGS. 5A and 5C are partial cross-sectional views explaining the method of forming the columnar body formed of n stages of columnar body portions of the negative electrode for the non-aqueous electrolyte secondary battery in accordance with the first exemplary embodiment of the present invention. FIG. 6 is a schematic view showing an apparatus for manufacturing the columnar body formed of the n stages of columnar body portions of the negative electrode for the non-aqueous electrolyte secondary battery in accordance with the first exemplary embodiment of the present invention. Hereinafter, the columnar body having the n=2 stages of columnar body portions will be, for example, described.

Here, manufacturing apparatus 40 for forming the columnar body shown in FIG. 6 includes an electron beam (not shown) which is heating means, gas introduction pipe 42 for introducing oxygen gas into vacuum chamber 41, and fixing stand 43 for fixing the current collector, in vacuum chamber 41. Depressurization is performed by vacuum pump 47. Gas introduction pipe 42 includes nozzles 45 for injecting oxygen gas in vacuum chamber 41, and fixing stand 43 for fixing the current collector is provided above nozzles 45. Deposition source 46 which is deposited on the surface of the current collector so as to form the columnar body is located vertically under fixing stand 43. In manufacturing apparatus 40, the positional relationship between the current collector and deposition source 46 can be changed by the angle of fixing stand 43. That is, the obliquely erected directions of each stage of columnar body portions including n stages is controlled by changing the angle ω formed by a normal direction of the surface of the current collector and a horizontal direction by fixing stand 43.

Although the present manufacturing apparatus forming the n stages of columnar body portions on one surface of the current collector to manufacture the columnar body is described as an example, actually, the apparatus generally manufactures the columnar bodies on the both surfaces of the current collector.

First, as shown in FIGS. 5A and 6, non-protruding portion 12 and protruding portion 13 are formed on a band-shaped electrolyte copper foil having a thickness of 30 μm by a plating and current collector 11 in which protruding portion 13 having a height of 7.5 μm, a width of 10 μm and an interval of 20 μm is formed is manufactured (first step). In addition, current collector 11 is mounted on fixing stand 43 shown in FIG. 6.

Next, as shown in FIGS. 5B and 6, fixing stand 43 is arranged with respect to deposition source 46 by the angle ω (for example, 55°) with respect to the normal direction of current collector 11 and the active material such as Si (scrap silicon: purity 99.999%) is heated and evaporated by the electron beam so as to be made incident on protruding portion 13 of current collector 11 in a direction denoted by an arrow of FIG. 5B. At the same time, oxygen ($O_2$) gas is introduced from gas introduction pipe 42 and is supplied from nozzles 45 to current collector 11. At this time, for example, the inside of vacuum chamber 41 was in oxygen atmosphere with pressure of 3.5 Pa. Accordingly, the active material of SiOx which is obtained by combining Si and oxygen is formed by the angle $\theta_1$ on protruding portion 13 of current collector 11 provided on fixing stand 43 provided by an angle ω such that first columnar body portion 151 having a thickness of 0.1 μm to 5 μm in the obliquely erected direction covers at least surfaces 13a and 13b of protruding portion 13 of current collector 11 (second step). At this time, first columnar body portion 151 is formed in a state in which the value of x of the formed SiOx sequentially varies in the width direction of current collector 11. For example, in FIG. 5B, the value of x of the right side of the drawing is decreased and the value of x of the left side of the drawing is increased.

Next, as shown in FIGS. 5C and 6, current collector 11 in which first columnar body portion 151 is formed on protruding portion 13 is arranged at the position of an angle (180−ω) (for example, 125°) with respect to the normal direction of current collector 11 by rotating fixing stand 43 as denoted by a dotted line of the drawing. Then, the active material such as Si (scrap silicon: purity 99.999%) is evaporated from deposition source 46 and is made incident to first columnar body portion 151 on current collector 11 in a direction denoted by an arrow of FIG. 5C. At the same time, oxygen ($O_2$) gas is introduced from gas introduction pipe 42 and is supplied from nozzles 45 to current collector 11. Accordingly, the active material of SiOx which is obtained by combining Si and oxygen is formed on first columnar body portion 151 by an angle $\theta_2$ such that second columnar body portion 152 having a thickness of 10 μm to 30 μm in the obliquely erected direction covers at least surface 13c of protruding portion 13 of current collector 11 (third step). At this time, the second columnar body portion 152 is formed in a state in which the value of x of the formed SiOx sequentially varies in the width direction of current collector 11. For example, in second columnar body portion 152 shown in FIG. 5C, the value of x of the left side of the drawing is decreased and the value of x of the right side of the drawing is increased. Accordingly, first columnar body portion 151 and second columnar body portion 152 are formed which the variation directions of the value of x thereof are reverse in the width direction of current collector 11 and the obliquely erected angles and the obliquely erected direction thereof are different from each other.

Accordingly, negative electrode 1 having columnar body 15 including first columnar body portion 151 and second columnar body portion 152 which cover at least surfaces 13a, 13b and 13c of protruding portion 13 of current collector 11 is manufactured.

Figure 7:
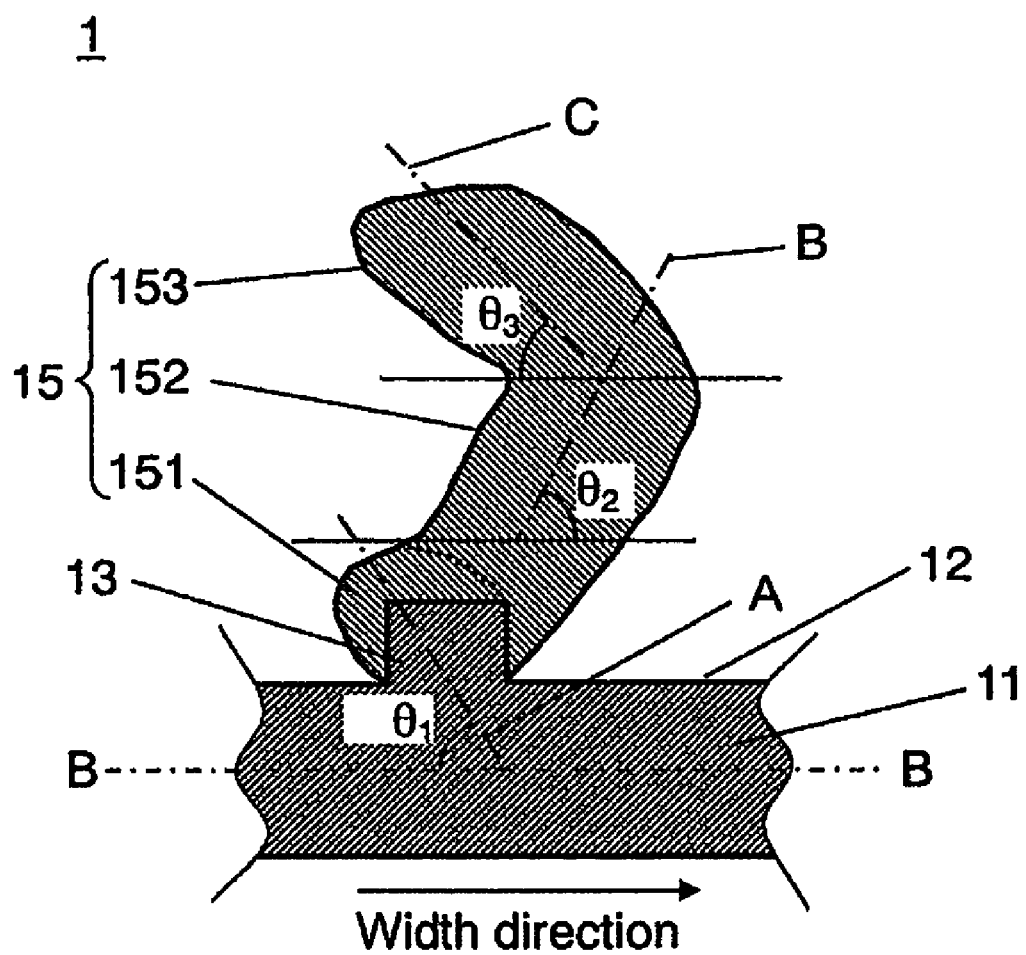
FIG. 7 is a partial cross-sectional view showing another example of the structure of the negative electrode in accordance with the first exemplary embodiment of the present invention.

Although the columnar body including the n=2 stages of columnar body portions are described as an example, the present invention is not limited thereto. For example, by repeating the second step of FIG. 5B and the third step of FIG. 5C, the columnar body including n (n≧2) stages of columnar body portions may be formed (fourth step). For example, as shown in FIG. 7, if the columnar body includes the n=3 stages of columnar body portions, the height of third columnar body portion 153 does not need to be equal to that of second columnar body portion 152 and may be arbitrarily set by a relationship between adjacent columnar bodies or the design capacity of the battery. At this time, it is preferable that the third columnar body portion 153 is formed to be equal to first columnar body portion 151 in the obliquely erected direction or the variation direction of the value of x of the SiOx is equal. In addition, the obliquely erected angle $\theta_3$ may be equal or different. Here, the obliquely erected angle $\theta_3$ is an angle between a central line C of the obliquely erected direction and the central line AA-AA of the thickness direction of current collector 11.

Although the manufacturing apparatus manufactures the columnar body in the current collector having a predetermined size as an example, the present invention is not limited thereto and various devices can be configured. For example, a roll-shaped current collector may be disposed between a feed roll and a rewind roll, a plurality of film forming rolls may be arranged in series therebetween, and the columnar body having n stages of columnar body portions may be manufactured while moving the current collector in one direction. After the columnar body is formed on one surface of the current collector, the columnar body may be formed on the other surface of the current collector by reversing the current collector.

Accordingly, it is possible to manufacture the negative electrode with excellent productivity.

Second Exemplary Embodiment

Figure 8:
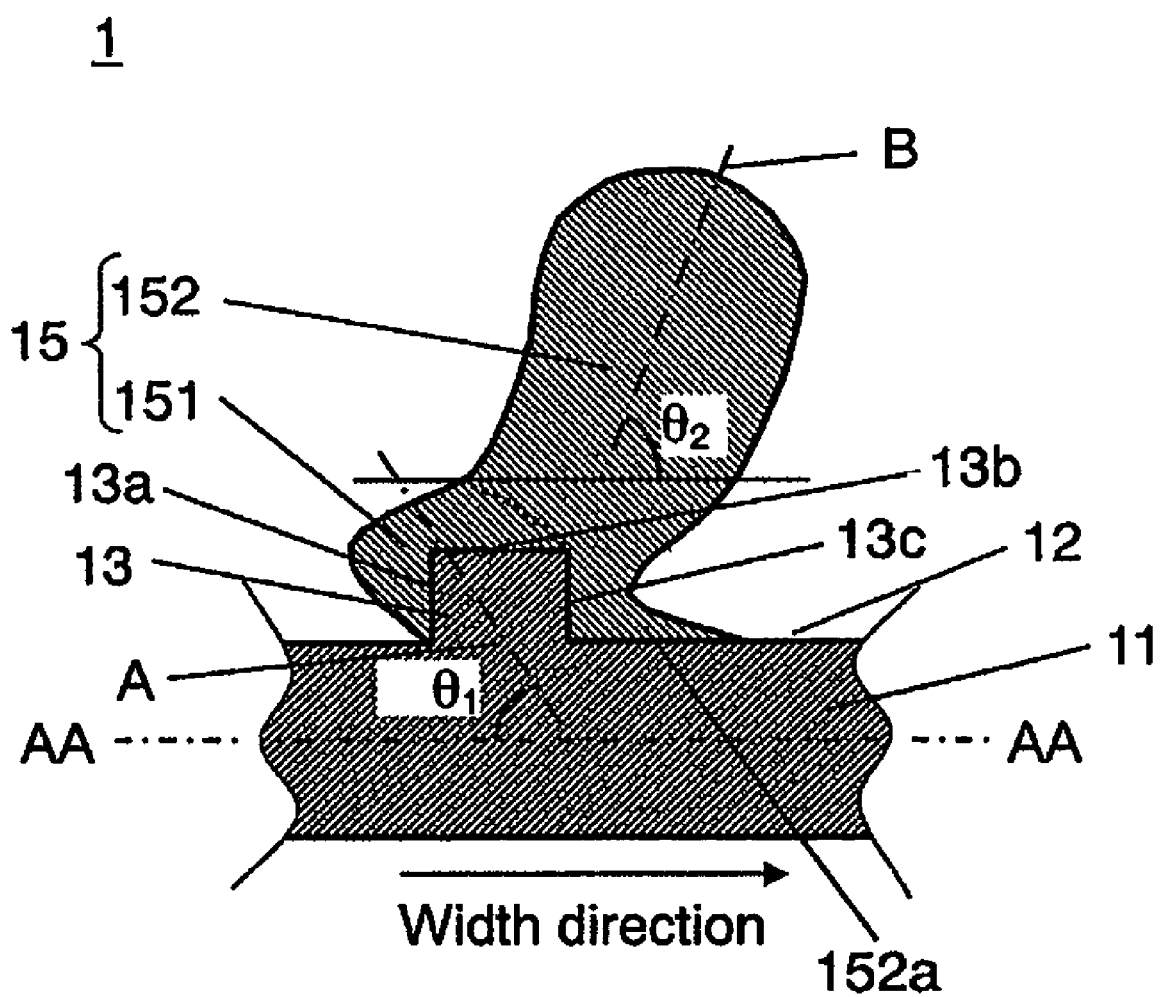
FIG. 8 is a partial cross-sectional view showing the structure of a negative electrode in accordance with a second exemplary embodiment of the present invention.

FIG. 8 is a partial cross-sectional view showing the structure of a negative electrode in accordance with a second exemplary embodiment of the present invention. Even in the present embodiment, the same lamination type battery as FIG. 1 is used and thus the detailed description thereof will be omitted. The configuration material of the positive electrode mixture layer, the positive electrode current collector, the current collector or the columnar body portion is equal to that of the first exemplary embodiment and thus the detailed description thereof will be omitted.

As shown in FIG. 8, the negative electrode is different from negative electrode 1 in accordance with the first exemplary embodiment in that columnar body 15 has base portion 152a covering non-protruding portion 12 in the longitudinal direction of current collector 11.

That is, as shown in FIG. 8, non-protruding portion 12 and protruding portion 13 are provided on at least the upper surface of current collector 11. The active material which is expressed by SiOx and configures negative electrode 20 is obliquely erected by an oblique deposition method using a sputtering method or a vacuum deposition method and is formed on protruding portion 13 in the shape of columnar body 15 including the n (n≧2) stages of columnar body portions. At this time, columnar body 15 including the n=2 stages of columnar body portions such as first columnar body portion 151 and second columnar body portion 152, which cover at least three surfaces 13a, 13b and 13c of the protrusion portion in the section of the longitudinal direction of protruding portion 13 of current collector 11, is formed.

Columnar body 15 has base portion 152a formed at the time of forming second columnar body portion 152, from surface 13c of protruding portion 13 of current collector 11 forming an acute angle between the central line of the growth direction and the central line of current collector 11 to non-protruding portion 12 of current collector 11.

The method of forming base portion 152a is equal to the first exemplary embodiment described with reference to FIGS. 5A to 5C and FIG. 6 and thus the detailed description thereof will be omitted. For example, at the time of forming second columnar body portion 152, the shape and the size of the base portion can be controlled by adjusting the incident angle ω (see FIG. 6) with respect to the surface of protruding portion 13 of current collector 11, when the oblique deposition is performed, in correspondence with the shape and the interval of protruding portion 13 of current collector 11. Accordingly, the columnar body having the same configuration as the first exemplary embodiment may be obtained according to the condition, but, for example, the base portion can be formed by performing the oblique deposition by an angle smaller than the incident angle ω of the first exemplary embodiment. The shape or the size of the base portion can be adjusted by arbitrarily controlling, for example, the height or the shape and the interval of the protruding portion of the current collector.

According to the second exemplary embodiment, an exposure surface of non-protruding portion 12 of current collector 11 in which lithium metal is susceptible to be precipitated during charging/discharging is covered by base portion 152a such that it is possible to suppress the precipitation of the lithium metal and realize negative electrode 20 with high reliability.

In addition to at least the three surfaces of protruding portion 13 of current collector 11, the adhesion area with current collector 11 is increased by columnar body 15 having base portion 152a and thus the negative electrode which further suppresses peeling due to the charging/discharging cycle can be manufactured.

Although the base portion is formed in the second columnar body portion in the present exemplary embodiment, the present invention is not limited thereto. For example, at the time of forming the first columnar body portion, the base portion may be formed on the non-protruding portion at the side erected obliquely. In addition, the base portion may be formed on the non-protruding portions at the both sides of the side in which the first columnar body portion and the second columnar body are obliquely erected.

Third Exemplary Embodiment

Figure 9:
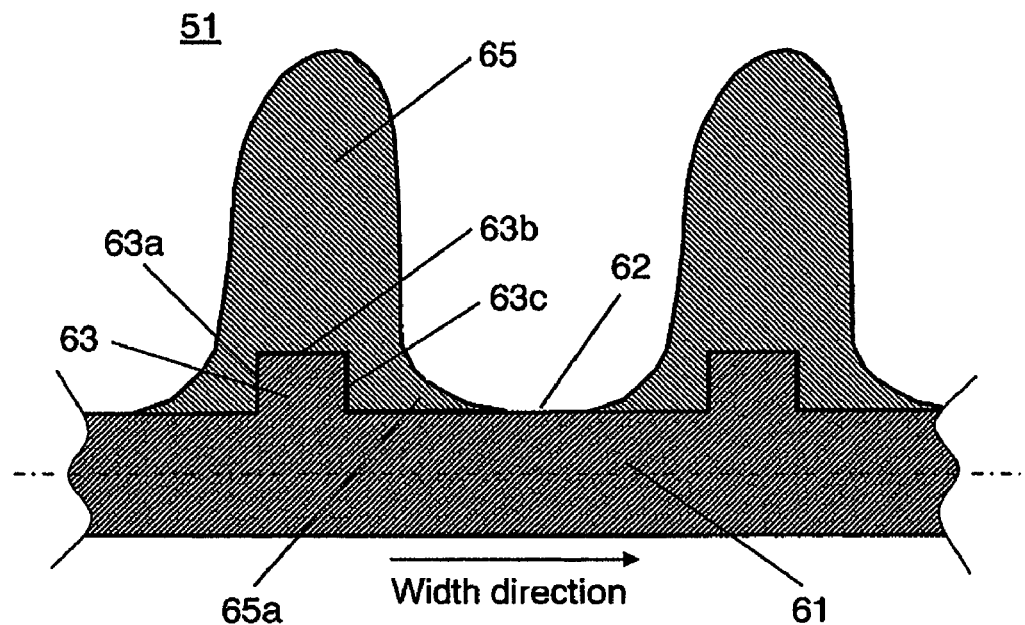
FIG. 9 is a partial cross-sectional view showing the structure of a negative electrode in accordance with a third exemplary embodiment of the present invention.

FIG. 9 is a partial cross-sectional view showing the structure of a negative electrode in accordance with the third exemplary embodiment of the present invention. Even in the present exemplary embodiment, the same lamination type battery as FIG. 1 is used and thus the detailed description thereof will be omitted. The configuration material of the positive electrode mixture layer, the positive electrode current collector, the current collector or the columnar body portion is equal to that of the first exemplary embodiment and thus the detailed description thereof will be omitted.

As shown in FIG. 9, the negative electrode is different from negative electrode 1 in accordance with the first exemplary embodiment in that columnar body 65 has base portion 65a covering at least a portion of non-protruding portions 62 at the both sides of a protruding portion 63 in the longitudinal direction of current collector 61 and columnar body 65 gradually narrows toward the front end thereof.

That is, as shown in FIG. 9, non-protruding portion 62 and protruding portion 63 are provided on at least the upper surface of current collector 61. The active material which is expressed by SiOx and configures negative electrode 51 is obliquely erected by an oblique deposition method using a sputtering method or a vacuum deposition method and is formed on protruding portion 63 in the shape of columnar body 65 including the n (n≧2) stages of columnar body portions. At this time, columnar body 65 including, for example, the n=20 stages of columnar body portions (not shown) and base portion 65a covering at least the portion of the non-protruding portions 62 at the both sides of protruding portion 63 in the longitudinal direction and at least three surfaces 63a, 63b and 63c of the protrusion portion in the section of the longitudinal direction of protruding portion 63 of current collector 61 is formed.

The method of forming columnar body 65 having base portion 65a is equal to those of the first exemplary embodiment and the second exemplary embodiment excluding the n=20 stages of columnar body portions and thus will be briefly described.

First, up to n=4 stages to n=6 stages of columnar body portions, for example, the active material is made incident by the angle ω shown in FIG. 6 of 30° to 50° in the odd-numbered stages of columnar body portion or is made incident by the angle of 130° to 150° (=180°−ω) in the even-numbered stages of columnar body portion. Accordingly, a portion of the columnar body is formed on protruding portion 63 of current collector 61 while forming base portion 65a on non-protruding portion 62 of current collector 61.

Next, in the remaining n=14 stages to n=16 stages of columnar body portions, for example, the active material is made incident by the angle ω shown in FIG. 6 of 55° in the odd-numbered stages of columnar body portion or is made incident by the angle of 125° (=180°−ω) in the even-numbered stages of columnar body portion. Accordingly, the each columnar body portions are grown and formed on protruding portion 63 of current collector 61.

By this method, columnar body 65 including the n=20 stages of columnar body portions is formed.

At this time, the shape and the size of columnar body 65 can be controlled by adjusting the angle ω (see FIG. 6) with respect to the surface of protruding portion 63 of current collector 61 when the oblique deposition is performed, in correspondence with the shape and the interval of protruding portion 63 of current collector 61.

According to the present exemplary embodiment, an exposure surface of the non-protruding portion of the current collector in which lithium metal is susceptible to be precipitated during charging/discharging is partially covered by the base portion such that it is possible to suppress the precipitation of the lithium metal and realize the negative electrode with high reliability.

In addition to at least the three surfaces of the protruding portion of the current collector, the adhesion area with the current collector is increased by the columnar body having the base portion and thus the negative electrode which further suppresses peeling due to the charging/discharging cycle can be manufactured.

Since the columnar body is formed such that the cross-section area of the horizontal direction is decreased toward the front end thereof, mechanical strength for the stress applied to the columnar body of the negative electrode through the positive electrode or the separator at the time of forming the electrode group can be improved and the negative electrode with excellent reliability, in which peeling or damage is unlikely to be generated, can be formed. Particularly, in the non-aqueous electrolyte secondary battery having a square type or a cylindrical type winding electrode group, large effect is obtained.

Figure 10:
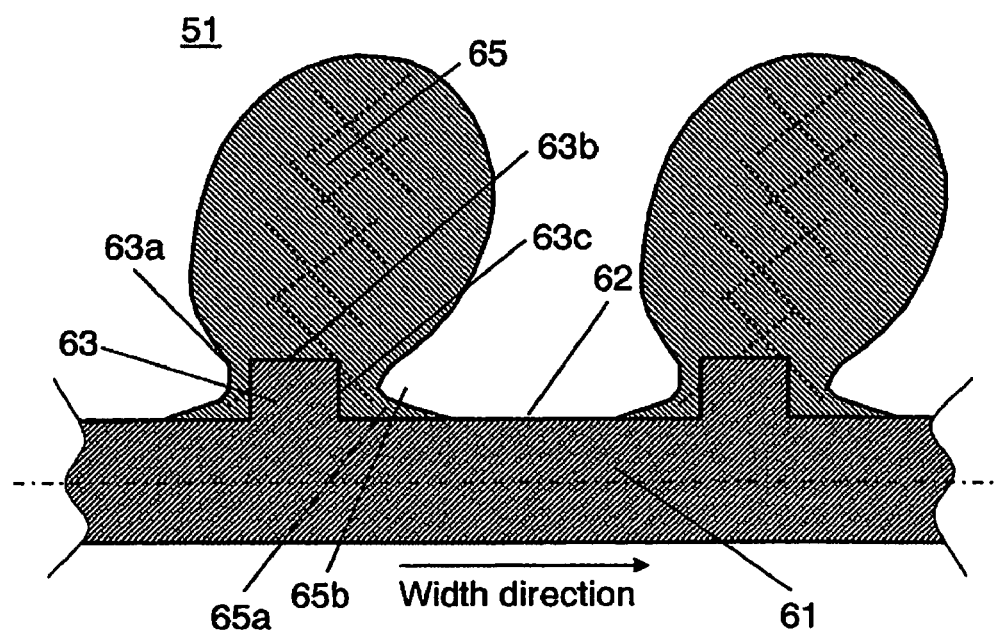
FIG. 10 is a partial cross-sectional view showing another example of the structure of the negative electrode in accordance with the third exemplary embodiment of the present invention.

Although the columnar body is formed such that the cross-section area of the horizontal direction is decreased toward the front end in the present exemplary embodiment, the present invention is not limited thereto. For example, as shown in FIG. 10, constricted portion 65b may be provided in a portion of columnar body 65. By this configuration, the surface area of the columnar body is increased so as to improve reactivity. Since the holding space of the electrolyte is ensured such that the holding state of the electrolyte is improved, the cycle characteristic is improved. If constricted portion 65b is formed in the vicinity of protruding portion 63, the expansion/contraction in the interface between the columnar body and the current collector can be suppressed and thus the stress is prevented. Accordingly, peeling can be prevented. In addition, this structure is particularly valid in the lamination type non-aqueous electrolyte secondary battery.

Fourth Exemplary Embodiment

Figure 11:
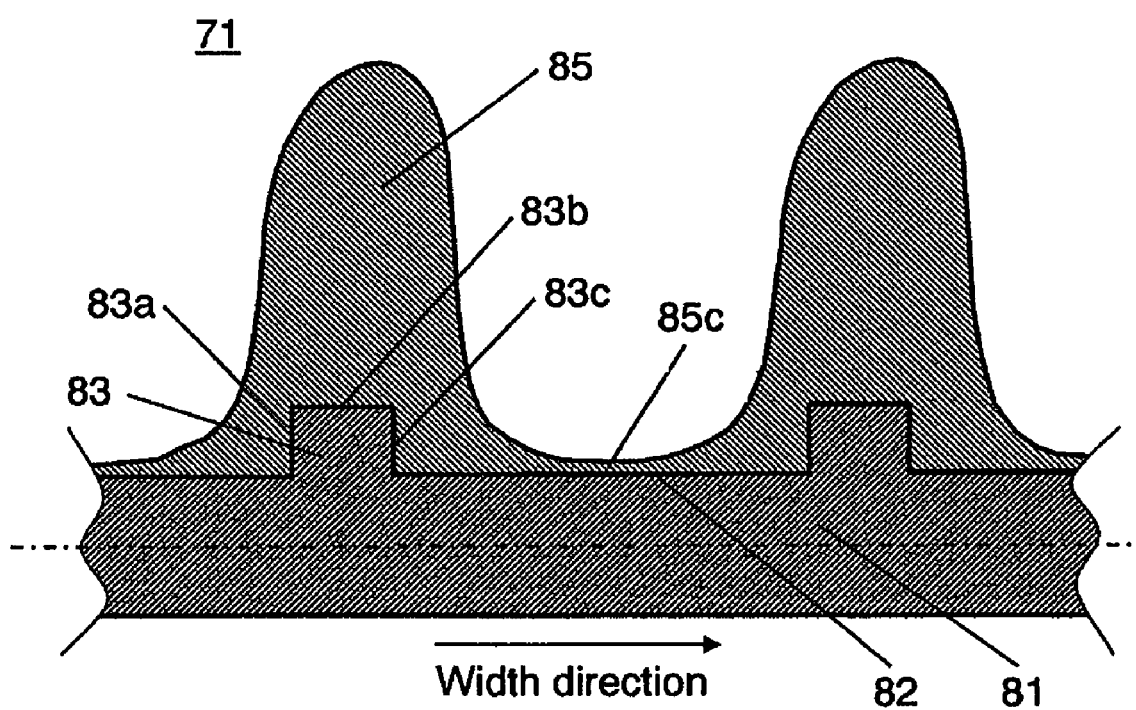
FIG. 11 is a partial cross-sectional view showing the structure of a negative electrode in accordance with a fourth exemplary embodiment of the present invention.

FIG. 11 is a partial cross-sectional view showing the structure of a negative electrode in accordance with the fourth exemplary embodiment of the present invention. Even in the present exemplary embodiment, the same lamination type battery as FIG. 1 is used and thus the detailed description thereof will be omitted. The configuration material of the positive electrode mixture layer, the positive electrode current collector, the current collector or the columnar body portion is equal to that of the first exemplary embodiment and thus the detailed description thereof will be omitted.

As shown in FIG. 11, the negative electrode is different from negative electrode 1 in accordance with the third exemplary embodiment in that columnar body 85 has covering layer 85c covering at least non-protruding portion 82 of current collector 81.

That is, as shown in FIG. 11, non-protruding portion 82 and protruding portion 83 are provided on at least the upper surface of current collector 81. The active material which is expressed by SiOx and configures negative electrode 71 is obliquely erected by an oblique deposition method using a sputtering method or a vacuum deposition method and is formed on protruding portion 83 in the shape of columnar body 85 including the n (n≧2) stages of columnar body portions. At this time, columnar body 85 including n=20 (not shown) stages of columnar body portions and covering layer 85c covering at least three surfaces 83a, 83b and 83c of the protrusion portion in the section of the longitudinal direction of protruding portion 83 of current collector 81 and at least the non-protruding portion 82 surrounding the protruding portion 83 is formed.

Here, the method of forming columnar body 85 is equal to those of the first exemplary embodiment to the third exemplary embodiment excluding covering layer 85c covering at least the non-protruding portion 82 of current collector 81 and the n=20 stages of columnar body portions and thus will be briefly described.

First, up to n=4 stages to n=6 stages of columnar body portions, for example, the active material is made incident by the angle ω shown in FIG. 6 of 0° to 30° in the odd-numbered stages of columnar body portion or is made incident by the angle of 150° to 180° (=180°−ω) in the even-numbered stages of columnar body portion. Accordingly, a portion of the columnar body is formed on protruding portion 83 of current collector 81 and covering layer 85c having a thickness of 0.5 μm to 3 μm and covering the surface of current collector 81 including protruding portion 83 of current collector 81.

Next, in the remaining n=14 stages to n=16 stages of columnar body portions, for example, the active material is made incident by the angle ω shown in FIG. 6 of 55° in the odd-numbered stages of columnar body portion or is made incident by the angle of 125° (=180°−ω) in the even-numbered stages of columnar body portion. Accordingly, the each columnar body portions is grown and formed on protruding portion 83 of current collector 81.

By this method, columnar body 85 including the n=20 stages of columnar body portions and covering layer 85c is formed.

At this time, the shape and the size of columnar body 85 can be controlled by adjusting the angle ω (see FIG. 6) with respect to the surface of protruding portion 83 of current collector 81 when the oblique deposition is performed, in correspondence with the shape and the interval of protruding portion 83 of current collector 81.

Although covering layer 85c is formed such that the base portions of adjacent columnar bodies overlap each other in the present exemplary embodiment, the present invention is not limited thereto. For example, the covering layer may be formed with a substantially uniform thickness by arranging the current collector in parallel to the deposition source.

According to the present exemplary embodiment, the same effect as the third exemplary embodiment can be obtained. In addition, since the non-protruding portion of the current collector is completely covered with the covering layer, it is possible to suppress the precipitation of the lithium metal and realize the negative electrode with higher reliability.

In addition to at least the three surfaces of the protruding portion of the current collector, the adhesion area with the current collector is increased by the columnar body having the covering layer, which completely covers the non-protruding portion, and thus the negative electrode which further suppresses peeling can be manufactured.

Similar to the third exemplary embodiment, the constricted portion may be provided in a portion of the columnar body. By this configuration, the surface area of the columnar body is increased so as to improve reactivity. Since the holding space of the electrolyte is ensured such that the holding state of the electrolyte is improved, the cycle characteristic is improved.

Hereinafter, the present invention is described in more detail with reference to the embodied examples. The present invention is not limited to the following embodied examples and used materials and so on may be modified without departing from the scope of the present invention.

Embodied Example 1

In an Embodied example 1, the configuration of the negative electrode described in the first exemplary embodiment is implemented. First, the columnar body of the negative electrode was manufactured using the manufacturing apparatus shown in FIG. 6.

First, as the current collector, a band-shaped electrolyte copper foil, in which a protruding portion is formed on the surface thereof with a height of 7.5 μm, a width of 10 μm, an interval of 20 μm, and a thickness of 30 μm using a plating method, was used.

Oxygen gas having purity of 99.7% was introduced from nozzles 45 into the vacuum chamber using Si as the active material of the negative electrode and using a deposition unit (obtained by combining a deposition source, a crucible and an electron beam generator) and the value of x of SiOx varied in the width direction, thereby manufacturing a first columnar body portion. At this time, the inside of the vacuum chamber was in oxygen atmosphere having pressure of 3.5 Pa. At the time of deposition, an electron beam generated by the electron beam generator was deflected by a deflection yoke and was irradiated to the deposition source. In the deposition source, a scrap material (scrap silicon: purity 99.999%) generated when a semiconductor wafer is formed was used.

The first columnar body portion was formed by adjusting the angle of the fixing stand to set the angle ω to 60° and setting a film formation rate to about 8 nm/s. Accordingly, a first stage of the first columnar body portion (having, for example, a height of 3 μm and a cross-section area of 150 μm$^2$) was formed. Similarly, a second stage or the second columnar body portion (having, for example, a height of 27 μm and a cross-section area of 150 μm$^2$) was formed such that the columnar body (having, for example, a height of 30 μm and a cross-section area of 150 μm$^2$) including the two stages of columnar body portions was formed, by the forming method described in the first exemplary embodiment.

When the angle with respect to the central line of the current collector of the columnar body of the negative electrode was evaluated by cross-section observation using scanning electron microscope (S-4700 made by Hitachi, Ltd.), the obliquely erected angle of each stage of columnar body portion was about 41°. At this time, the thickness (height) of the formed columnar body is 30 μm, with respect to the normal direction.

When an oxygen distribution was examined by measuring a linear distribution in the cross-section direction of the columnar body portion of each stage configuring the columnar body of the negative electrode using an electron beam probe micro analyzer (hereinafter referred to as "EPMA"), the oxygen concentration (value of x) was continuously increased in the (180−θ) direction from the obliquely erected angle θ in the width direction of the first columnar body portion and the second columnar body portion. The increase directions of the oxygen concentration (value of x) of the first columnar body portion and the second columnar body portion were opposite to each other. At this time, a range of x was 0.1 to 2 and an average thereof was 0.6.

The negative electrode having the columnar body covering the three surfaces of the protruding portion of the current collector was manufactured.

Thereafter, Li metal of 15 μm was deposited on the surface of the negative electrode by a vacuum deposition method. In an inner circumference side of the negative electrode, a negative electrode lead made of Cu was welded by providing an exposure portion in a Cu foil which does not face a positive electrode.

Next, the positive electrode having a positive electrode active material capable of inserting/extracting lithium ions was manufactured by the following method.

First, 93 parts by weight of LiCoO$_2$ powder which is the positive electrode active material and 4 parts by weight of acetylene black which is a conductive agent are mixed. An N-methyl-2-pyrolidone (NMP) solution (product No. #1320 made by KUREHA CORPORATION) of polyvinylidene-fluoride (PVDF) which is a binder was mixed to the obtained powder such that the weight of PVDF becomes 3 parts by weight. A predetermined amount of NMP was added to the obtained mixture to manufacture a paste for a positive electrode mixture. The obtained paste for the positive electrode mixture was coated on the both sides of the positive electrode current collector (thickness of 15 μm) including an aluminum (Al) foil using a doctor blade method, was rolled such that the density of the positive electrode mixture layer becomes 3.5 g/cc and the thickness becomes 160 μm, was sufficiently dried at 85° C., and was cut, thereby forming the positive electrode. In an inner circumference side of the positive electrode, a positive electrode lead made of Al was welded by providing an exposure portion in an Al foil which does not face the negative electrode.

The negative electrode and the positive electrode manufactured as described above were laminated with a separator made of porous polypropylene and having a thickness of 25 μm interposed therebetween so as to configure an electrode group of 40 mm×30 mm. Then, an ethylene carbonate/diethyl carbonate mixture solution of LiPF$_6$ was impregnated in the electrode group as an electrolyte so as to be accommodated in armored case (material: aluminum) and an opening of the armored case was sealed, thereby manufacturing a lamination type battery. The design capacity of the battery was 21 mAh. This was Sample 1.

Embodied Example 2

A negative electrode was manufactured similar to the Embodied example 1, except that the angle w becomes 70° by adjusting the angle of the fixing stand.

The obliquely erected angle of each stage of columnar body portion was about 54° and the thickness (height) of the formed columnar body was 30 μm.

From the EPMA, in the width direction of each columnar body portion, the oxygen concentration (value of x) in the (180−θ) direction from the obliquely erected angle θ was continuously increased. The increase directions of the oxygen concentration (value of x) of the first columnar body portion and the second columnar body portion were opposite to each other. At this time, a range of x was 0.1 to 2 and an average thereof was 0.6.

A non-aqueous electrolyte secondary battery manufactured by the same method as the Embodied example 1 was Sample 2, except that the above-described negative electrode is used.

Embodied Example 3

A negative electrode was manufactured similar to the Embodied example 1, except that the angle ω becomes 50° by adjusting the angle of the fixing stand.

The obliquely erected angle of each stage of columnar body portion was about 31° and the thickness (height) of the formed columnar body was 30 μm.

From the EPMA, in the width direction of each columnar body portion, the oxygen concentration (value of x) in the (180−θ) direction from the obliquely erected angle θ was continuously increased. The increase directions of the oxygen concentration (value of x) of the first columnar body portion and the second columnar body portion were opposite to each other. At this time, a range of x was 0.1 to 2 and an average thereof was 0.6.

A non-aqueous electrolyte secondary battery manufactured by the same method as the Embodied example 1 was Sample 3, except that the above-described negative electrode is used.

Embodied Example 4

A negative electrode was manufactured similar to the Embodied example 1, except that the thickness of the first columnar body portion is 1 lam and the thickness of the second columnar body portion is 29 μm. The obliquely erected angle of each stage of columnar body portion was about 41° and the thickness (height) of the formed columnar body was 30 μm.

From the EPMA, in the width direction of each columnar body portion, the oxygen concentration (value of x) from the obliquely erected angle θ in the (1800 direction was continuously increased. The increase directions of the oxygen concentration (value of x) of the first columnar body portion and the second columnar body portion were opposite to each other. At this time, a range of x was 0.1 to 2 and an average thereof was 0.6.

A non-aqueous electrolyte secondary battery manufactured by the same method as the Embodied example 1 was Sample 4, except that the above-described negative electrode is used.

Embodied Example 5

A negative electrode was manufactured similar to the Embodied example 1, except that the second columnar body portion is formed with a thickness of 22 μm at the oxygen atmosphere in which the inner pressure of the vacuum chamber is 1.7 Pa.

The obliquely erected angle of each stage of columnar body portion was about 41° and the thickness (height) of the formed columnar body was 25 μm.

From the EPMA, in the width direction of each columnar body portion, the oxygen concentration (value of x) from the obliquely erected angle θ in the (180−θ) direction was continuously increased. The increase directions of the oxygen concentration (value of x) of the first columnar body portion and the second columnar body portion were opposite to each other. At this time, a range of x was 0.1 to 2 and an average thereof was 0.3. Thereafter, Li metal of 10 μm was deposited on the surface of the negative electrode by a vacuum deposition method.

A non-aqueous electrolyte secondary battery manufactured by the same method as the Embodied example 1 was Sample 5, except that the above-described negative electrode is used.

Embodied Example 6

In an Embodied example 6, the configuration of the negative electrode described in the second exemplary embodiment is implemented, but basically is equal to the Embodied example 1 except that a base portion is formed in the second columnar body portion.

First, oxygen gas having purity of 99.7% was introduced from nozzles 45 into the vacuum chamber using Si and using a deposition unit (obtained by combining a deposition source, a crucible and an electron beam generator) and the value of x of SiOx varied in the width direction, thereby manufacturing a first columnar body portion (height of 3 μm).

Next, the base portion of the second columnar body portion was first formed by setting the angle ω of the fixing stand to 45°. Thereafter, the second columnar body portion having the base portion was formed by varying the angle ω of the fixing stand to 60°, thereby forming the columnar body (height of 30 μm) including the two stages of columnar body portions.

When the angle with respect to the central line of the current collector of the columnar body of the negative electrode was evaluated by cross-section observation using scanning electron microscope (S-4700 made by Hitachi, Ltd.), the obliquely erected angle of each columnar body portion was about 41°. At this time, the thickness (height) of the formed columnar body is 30 μm, with respect to the normal direction.

When an oxygen distribution was examined by measuring a linear distribution in the cross-section direction of the columnar body portions of each stage configuring the columnar body of the negative electrode using the EPMA, the oxygen concentration (value of x) was continuously increased in the (180−θ) direction from the obliquely erected angle θ in the width direction of the first columnar body portion and the second columnar body portion. The increase directions of the oxygen concentration (value of x) of the first columnar body portion and the second columnar body portion were opposite to each other. At this time, a range of x was 0.1 to 2 and an average thereof was 0.6.

The negative electrode having the columnar body covering the three surfaces of the protruding portion of the current collector and the base portion formed on the non-protruding portion was manufactured.

Except for the negative electrode, the electrode group was formed by the same method as the Embodied example 1 and was laminated by six layers, thereby manufacturing the lamination type battery having the design capacity of 256 mAh (21 mAh×2(both sides)×6=256 mAh). This was Sample 6.

Embodied Example 7

In an Embodied example 7, the configuration of the negative electrode described in the third exemplary embodiment is implemented. A negative electrode was manufactured by the same method as the Embodied example 1, except that the base portion covering at least a portion of the non-protruding portions of the both sides of the longitudinal direction of the current collector is included, the columnar body gradually narrows toward the front direction thereof, and the columnar body includes the n=20 stages of columnar body portions.

First, the first columnar body portion was formed by adjusting the angle of the fixing stand to set the angle ω to 45° and setting a film deposition rate to about 8 nm/s. Accordingly, the first columnar body portions (for example, the height of 1.5 μm) was formed.

Next, the second columnar body portion (for example, the height of 1.5 μm) was formed by an angle (180°−ω).

Next, the negative electrode having the columnar body having the base portion on the non-protruding portions at the both sides of the protruding portion with a height of 30 μm was manufactured by laminating total 18 stages including 9 stages of first columnar body portions and 9 stages of second columnar body portions by the same method, except that the angle ω of the fixing stand is adjusted to 60° in the odd-numbered stages and the even-numbered stages.

The obliquely erected angle of each stage of columnar body portion was about 41°. At this time, the thickness (height) of the formed columnar body is 30 μm, with respect to the normal direction.

When an oxygen distribution was examined by measuring a linear distribution in the cross-section direction of the each stage of columnar body portions configuring the columnar body of the negative electrode using the EPMA, the oxygen concentration (value of x) was continuously increased in the (180−θ) direction from the obliquely erected angle θ in the width direction of the even-numbered stages of columnar body portion and the odd-numbered stages of columnar body portion. The increase directions of the oxygen concentration (value of x) of the even-numbered stages of columnar body portion and the odd-numbered stages of columnar body portion were opposite to each other. At this time, a range of x was 0.1 to 2 and an average thereof was 0.6.

The negative electrode having the columnar body covering the three surfaces of the protruding portion of the current collector and having the base portion on the non-protruding portions at the both sides of the protruding portion was manufactured. At this time, the positive electrode was formed by the same method as the first exemplary embodiment.

The negative electrode and the positive electrode manufactured as described above were laminated by six layers with a separator interposed therebetween so as to configure an electrode group. Here, a complex film of polyethylene and polypropylene (2300 made by CELGARD; thickness of 25 μm) was used as the separator.

Next, the electrode group was inserted into an armored case made of aluminum, a non-aqueous electrolyte was injected, and the armored case was sealed in vacuum. The design capacity of the battery was 256 mAh (21 mAh×2(both sides)×6=256 mAh).

The non-aqueous electrolyte secondary battery having the negative electrode manufactured by the above-described method was Sample 7.

Embodied Example 8

A square type non-aqueous electrolyte secondary battery manufactured by the same method as the Embodied example 7 was Sample 8, except that the first to fourth (n=4) stage of columnar body portions (height of 0.2 μm to 0.5 μm) are formed by setting the angle ω of the fixing stand to 45° or 135° and the fifth to eighth (n=8) stage of columnar body portions are formed by setting the angle w of the fixing stand to 70° or 110°, and the remaining ninth to twentieth (n=20) stage of columnar body portions are formed by setting the angle ω of the fixing stand to 60° or 120°. At this time, the constricted portion shown in FIG. 11 was formed in the columnar body of the negative electrode.

Embodied Example 9

In an Embodied example 9, the configuration of the negative electrode described in the fourth exemplary embodiment is implemented.

The negative electrode was manufactured by the same method as the Embodied example 7, except that the covering layer covering the non-protruding portion of the current collector is formed. At this time, the covering layer was formed by the method described in the fourth exemplary embodiment and the columnar body including the n=20 stages of columnar body portions and having the covering layer having a thickness of 0.5 μm to 3 μm was formed by an oblique deposition, thereby manufacturing the negative electrode.

The lamination type non-aqueous electrolyte secondary battery having the design capacity of 256 mAh (21 mAh×2 (both sides)×6=256 mAh) and the negative electrode manufactured by the above-described method was Sample 9.

Comparative Example 1

As a Comparative example 1, a negative electrode was manufactured by the same method as the Embodied example 1, except that a columnar body having one layer is obliquely erected with a height (thickness) of 30 μm.

When the angle with respect to the central line of the current collector of the columnar body of the negative electrode was evaluated by cross-section observation using scanning electron microscope (S-4700 made by Hitachi, Ltd.), the obliquely erected angle of the columnar body was about 41°. At this time, the thickness (height) of the formed columnar body is 30 μm.

When an oxygen distribution was examined by measuring a linear distribution in the cross-section direction of the columnar body of the negative electrode using the EPMA, the oxygen concentration (value of x) was continuously increased in the (180−θ) direction from the obliquely erected angle θ in the width direction. At this time, a range of x was 0.1 to 2 and an average thereof was 0.6.

Except for the above-described negative electrode, the non-aqueous electrolyte secondary battery manufactured by the same method as the Embodied example 1 was Sample C1.

The following evaluation was performed with respect to the non-aqueous electrolyte secondary battery manufactured as described above.

First, the non-aqueous electrolyte secondary battery was charged/discharged in the following conditions at an environment temperature of 25° C.

Next, with respect to the design capacity, charging was made until the voltage of the battery becomes 4.2 V at constant current having an hour rate of 1.0 C and constant-voltage charging for attenuating from the constant voltage of 4.2 V to a current value having an hour rate of 0.05 C was made. Thereafter, the charging is ceased during 30 minutes.

Thereafter, discharging was made by constant current at a current value having an hour rate of 0.2 C until the voltage of the battery is reduced to 3.0 V.

Then, the above-described steps are set to one cycle and discharging capacity of a third cycle was evaluated as the capacity of the battery.

Similarly, first, the non-aqueous electrolyte secondary battery was repeatedly charged/discharged in the following conditions at an environment temperature of 25° C.

Next, with respect to the design capacity, charging was made until the voltage of the battery becomes 4.2 V at constant current having an hour rate of 1.0 C and charging was made until charging current is decreased to a current value having an hour rate of 0.05 C at a constant voltage of 4.2 V. Thereafter, the charging is ceased during 30 minutes.

Thereafter, discharging was made by constant current at a current value having an hour rate of 0.2 C until the voltage of the battery is reduced to 3.0 V. Then, the discharging is ceased during 30 minutes.

The charging/discharging cycle was set to one cycle and the cycle was repeated 500 times. The charging/discharging cycle characteristic was evaluated by a capacity retaining ratio (%) which is a percentage of a discharging capacity of a $500^{th}$ cycle to a discharging capacity of a first cycle. That is, as the capacity retaining ratio is close to 100, the charging/discharging cycle characteristic is excellent.

A percentage of the discharging capacity at the time of discharging of 0.2 C to the charging capacity was set to charging/discharging efficiency (%). In addition, a ratio of the discharging capacity at the time of high-rate discharging of 1.0 C to the discharging capacity at the time of discharging of 0.2 C was set to a high-rate ratio (%).

The capacity retaining ratio, charging/discharging efficiency and a high-rate ratio were measured in a tenth cycle and the $500^{th}$ cycle.

Hereinafter, the parameters and the evaluation results of Samples 1 to 9 and Sample C1 are shown in Table 1 and Table 2.

Figure 12:
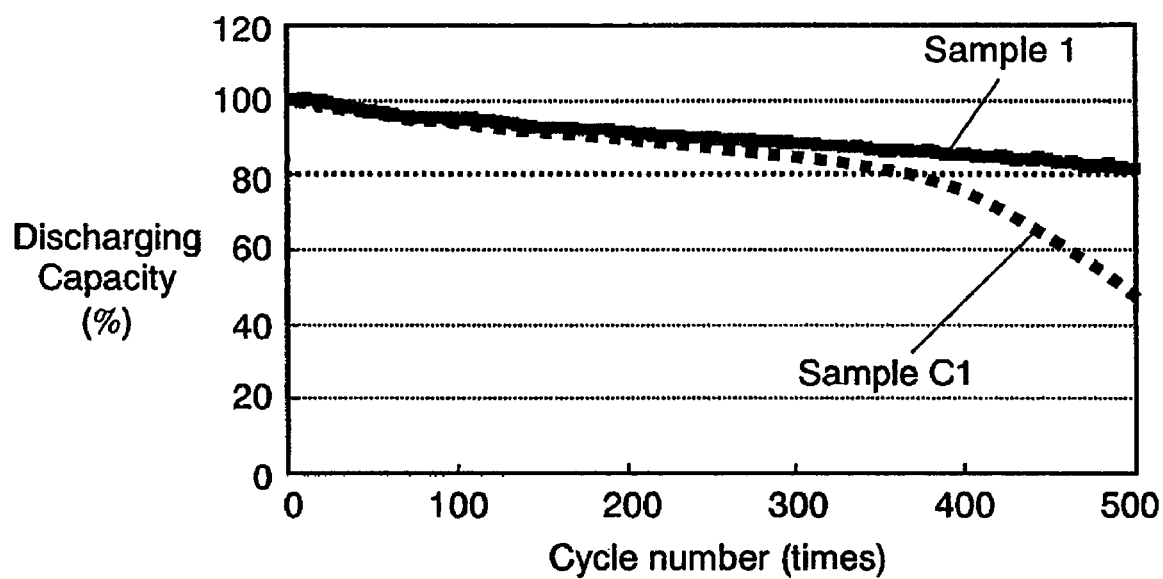
FIG. 12 is a view showing an example of charging/discharging cycle characteristics in samples of embodied example and comparative example.
Figure 13A:
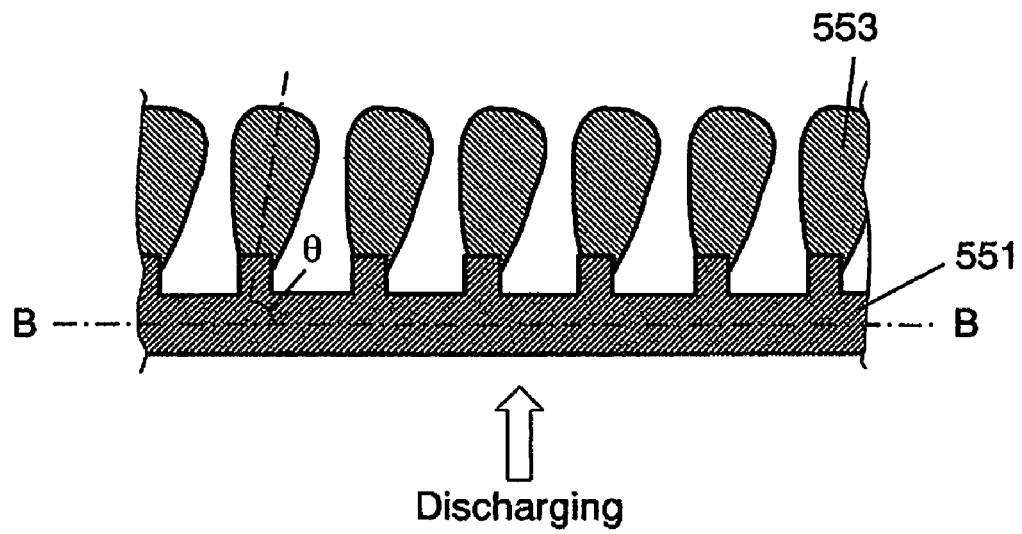
FIG. 13A is a partial cross-sectional view showing a conventional structure before charging a negative electrode.
Figure 13B:
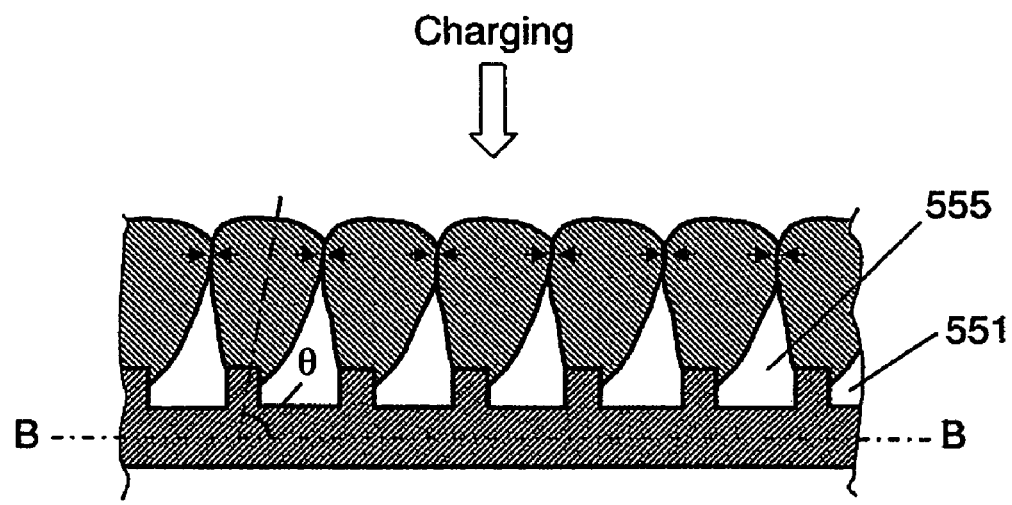
FIG. 13B is a partial cross-sectional view showing the conventional structure after charging the negative electrode.

FIG. 12 shows the evaluation result of Sample 1 and Sample C1 as an example of the charging/discharging cycle characteristic.

As shown in Table 1, Table 2 and FIG. 12, compared with Sample 1 and Sample C1, the capacity retaining ratio was hardly changed in the tenth cycle. However, in the $500^{th}$ cycle, Sample 1 has a capacity retaining ratio of about 81% and Sample C1 has a capacity retaining ratio which is decreased to about 48%. This is because the three surfaces of the current collector are covered by the columnar body and the columnar body includes a multi-stage configuration as a two-stages configuration such that the adhesion strength between the columnar body and the current collector can be improved, the contact between adjacent columnar bodies during charging/discharging can be suppressed, and wrinkles or distortion of the current collector and peeling or break of the columnar body can be suppressed.

TABLE 1

|  | Lamination number of electrode group | Vacuum at the time of introducing $O_2$(Pa) | Base portion or covering layer | Existence of constricted portion | n (stage) | Obliquely erected angle (°) | Thickness of first columnar body portion (μm) | Thickness of columnar body (μm) | Average value of x in SiOx |
|---|---|---|---|---|---|---|---|---|---|
| Sample 1 | One | 3.5 | None | None | 2 | 41 | 3 | 30 | 0.6 |
| Sample 2 | One | 3.5 | None | None | 2 | 54 | 3 | 30 | 0.6 |
| Sample 3 | One | 3.5 | None | None | 2 | 31 | 3 | 30 | 0.6 |
| Sample 4 | One | 3.5 | None | None | 2 | 41 | 1 | 30 | 0.6 |
| Sample 5 | One | 1.7 | None | None | 2 | 41 | 3 | 25 | 0.3 |
| Sample 6 | Six | 3.5 | Base portion | None | 2 | 41 | 3 | 30 | 0.6 |
| Sample 7 | Six | 3.5 | Base portions at the both sides | None | 20 | 41 | 1.5 | 30 | 0.6 |
| Sample 8 | Six | 3.5 | Base portions at the both sides | existence | 20 | 41 | 0.2–0.5 | 30 | 0.6 |
| Sample 9 | Six | 3.5 | Covering layer | None | 20 | 41 | — | 30 | 0.6 |
| Sample C1 | One | 3.5 | None | None | 1 | 41 | 30 | 30 | 0.6 |

TABLE 2

|  | Cycle number (times) | Charging/discharging efficiency (%) | High-rate ratio (%) | Capacity retaining ratio (%) |
|---|---|---|---|---|
| Sample 1 | 10 | 99.8 | 93 | 100 |
|  | 500 | 99.8 | 87 | 81 |
| Sample 2 | 10 | 99.8 | 93 | 100 |
|  | 500 | 99.8 | 88 | 82 |
| Sample 3 | 10 | 99.8 | 93 | 100 |
|  | 500 | 99.8 | 87 | 79 |
| Sample 4 | 10 | 99.8 | 93 | 100 |
|  | 500 | 99.8 | 86 | 78 |
| Sample 5 | 10 | 99.8 | 93 | 100 |
|  | 500 | 99.8 | 88 | 80 |
| Sample 6 | 10 | 99.8 | 93 | 100 |
|  | 500 | 99.8 | 85 | 82 |
| Sample 7 | 10 | 99.8 | 93 | 100 |
|  | 500 | 99.8 | 86 | 84 |
| Sample 8 | 10 | 99.8 | 93 | 100 |
|  | 500 | 99.8 | 84 | 81 |
| Sample 9 | 10 | 99.8 | 93 | 100 |
|  | 500 | 99.8 | 88 | 80 |
| Sample C1 | 10 | 99.8 | 93 | 100 |
|  | 500 | 99.2 | 83 | 48 |

As shown in Table 1 and Table 2, in Sample 1 to Sample 3, it can be seen that, although the obliquely erected angle of each of the columnar body portions of the columnar body varies from 31° to 54°, the capacity retaining ratio, the charging/discharging efficiency and the high-rate ratio hardly vary and excellent characteristic can be maintained.

In Sample 1 and Sample 4, it can be seen that, although the thickness (height) of the first columnar body portion configuring the columnar body varies, the capacity retaining ratio, the charging/discharging efficiency and the high-rate ratio hardly vary and excellent characteristic can be maintained. In Sample 4, a value which is slightly lower than that of Sample 1 is measured. This is caused by a difference in adhesion strength because the thickness of the first columnar body portion is reduced to ⅓.

In Sample 1 and Sample 5, if the average value of x in SiOx configuring the columnar body is 0.3 and 0.6, the capacity retaining ratio after the 500 cycles was slightly decreased in Sample 5 having a small average value of x, compared with Sample 1 having a large average value of x. The small average value of x corresponds to large expansion/contraction during charging/discharging. Accordingly, the stress or the distortion of the current collector due to the expansion/contraction of the columnar body is increased and the capacity retaining ratio is slightly decreased.

In Sample 1 and Sample 6, the capacity retaining ratio, the charging/discharging efficiency and the high-rate ratio hardly vary due to the existence of the base portion of the columnar body, but the capacity retaining ratio was slightly high in Sample 6 having the base portion. This is because the adhesion strength between the columnar body and the current collector is improved by the base portion.

In Sample 6 and Sample 7, if the base portion of the columnar body is formed at the both ends, the capacity retaining ratio and the high-rate ratio are slightly improved. This is because the area of the base portion is further increased and thus the adhesion strength between the columnar body and the current collector is improved.

In Sample 7 and Sample 8, the capacity retaining ratio was slightly decreased by the constricted portion provided in the portion of the columnar body. This is because the stress of the expansion/contraction is apt to be concentrated to the constricted portion and thus a probability that crack occurs is increased as the cycle progresses. However, since the surface area reacted by the constricted portion is increased, the capacity of the battery was improved by about several %.

In Sample 9, since the covering layer covering the current collector is provided, the capacity retaining ratio was slightly decreased compared with other samples, but the high-rate ratio was superior. This is because the area of the active material facing the positive electrode is large. In contrast, since the entire surface of the current collector is covered, the covering layer is susceptible to be cracked due to expansion/contraction and thus the capacity retaining ratio was slightly decreased.

However, the differences in characteristic among Sample 1 to Sample 9 are small and the non-aqueous electrolyte secondary battery which is remarkably improved in the high-rate characteristic or the cycle characteristic can be realized by using the negative electrode including the columnar body according to the present invention.

Although the example in which Si or SiOx is used as the active material of the columnar body is described, the present invention is not specially limited if an element capable of reversibly inserting/extracting lithium ions is used and at least one element of Al, In, Zn, Cd, Bi, Sb, Ge, Pb and Sn may be preferably used. A material other than the above-described elements may be included as the active material. For example, transition metal or 2A group elements may be included.

In the present invention, the shape and the formation interval of the protruding portions formed on the current collector is not limited to the contents described in the above-mentioned exemplary embodiments and may be modified to any shape if the columnar body erected obliquely can be formed.

The obliquely erected angle formed by the central line of the columnar body and the central line of the current collector and the shape and the size of the columnar body are not limited to the above-mentioned exemplary embodiments and may be properly modified according to the necessary characteristics of the used non-aqueous electrolyte secondary battery or the method of manufacturing the negative electrode.

Industrial Availability

According to a negative electrode for a non-aqueous electrolyte secondary battery of the present invention, it is possible to provide a non-aqueous electrolyte secondary battery which is superior in a high-rate characteristic or a charging/discharging cycle characteristic, while realizing high capacity. Accordingly, the non-aqueous electrolyte secondary battery can be used in a mobile electronic apparatus such as a mobile telephone or a PDA or a large electronic apparatus, which is expected to be in great demands in the future.

The invention claimed is:

1. A negative electrode for a non-aqueous electrolyte secondary battery, which reversibly inserts/extracts lithium ions, the negative electrode comprising:
    a current collector in which a non-protruding portion and a protruding portion are formed at least on one surface thereof; and
    a columnar body which is formed by laminating n (n≧2) stages of columnar body portions which are obliquely erected on the protruding portion of the current collector and in which a content ratio of elements sequentially vary in a longitudinal direction of the current collector, and which has a configuration in which variation directions of content ratios of elements of odd-numbered stages of columnar body portions and even-numbered stages of columnar body portions are different from each other,
    wherein at least three surfaces of the protruding portion in a section of the longitudinal direction are covered by the columnar body portions.

2. The negative electrode for a non-aqueous electrolyte secondary battery of claim 1, wherein at least two surfaces of the protruding portion of the current collector in the section of the longitudinal direction are covered by a first columnar body portion and one remaining surface is covered by a second columnar body portion.

3. The negative electrode for a non-aqueous electrolyte secondary battery of claim 1 or 2, wherein the columnar body includes a base portion which widens toward the non-protruding portion of at least one side in the section of the longitudinal direction of the current collector.

4. The negative electrode for a non-aqueous electrolyte secondary battery of claim 3, wherein the columnar body formed on the protruding portion gradually narrows toward a front end thereof.

5. The negative electrode for a non-aqueous electrolyte secondary battery of claim 3, wherein the columnar body formed on the protruding portion includes a constricted portion at a portion thereof.

6. The negative electrode for a non-aqueous electrolyte secondary battery of claim 1 or 2, wherein the columnar body includes a covering layer covering the non-protruding portion at least in the vicinity of the current collector.

7. The negative electrode for a non-aqueous electrolyte secondary battery of claim 6, wherein the columnar body formed on the protruding portion gradually narrows toward a front end thereof.

8. The negative electrode for a non-aqueous electrolyte secondary battery of claim 6, wherein the columnar body formed on the protruding portion includes a constricted portion at a portion thereof.

9. The negative electrode for a non-aqueous electrolyte secondary battery of claim 1, wherein, in a discharging state, the n stages of columnar body portions of the columnar body are obliquely erected on the protruding portion of the current collector and the odd-numbered stages of columnar body portions and the even-numbered stages of columnar body portions are laminated in a zigzag shape in a thickness direction.

10. The negative electrode for a non-aqueous electrolyte secondary battery of claim 1, wherein, in a charging state, an acute angle formed by an intersection of a central line of an obliquely erected direction of the columnar body portions and a central line of the thickness of the current collector is larger than an angle in a discharging state.

11. The negative electrode for a non-aqueous electrolyte secondary battery of claim 1, wherein an active material which reversibly inserts/extracts at least the lithium ions and has theoretical capacity density of more than 833 mAh/cm$^3$ is used as the columnar body portions.

12. The negative electrode for a non-aqueous electrolyte secondary battery of claim 11, wherein a material expressed by SiOx including at least silicon is used as the active material.

13. The negative electrode for a non-aqueous electrolyte secondary battery of claim 12, wherein a value of x of the material expressed by SiOx including silicon is continuously increased from a side forming an acute angle to a side forming an obtuse angle, with respect to an intersection angle between the central line of the obliquely erected direction of the columnar body portions and the central line of the thickness direction of the current collector.

14. A non-aqueous electrolyte secondary battery comprising:
    the negative electrode for the non-aqueous electrolyte secondary battery of claim 1;
    a positive electrode which reversibly inserts/extracts lithium ions; and
    a non-aqueous electrolyte.

15. A method of manufacturing a negative electrode for a non-aqueous electrolyte secondary battery which reversibly inserts/extracts lithium ions, the method comprising:
    a first step of forming a non-protruding portion and a protruding portion on at least one surface of a current collector;
    a second step of forming a first columnar body portion, which is obliquely erected, on the protruding portion so as to cover at least two surfaces of the protruding portion in a section of a longitudinal direction of the protruding portion; and
    a third step of forming a second columnar body portion, which is obliquely erected in a direction different from that of the first columnar body portion, on the first columnar body portion so as to cover one remaining surface in the section of the longitudinal direction of the protruding portion.

16. The method of manufacturing a negative electrode for a non-aqueous electrolyte secondary battery of claim 15, further comprising:
    after the third step, a fourth step of forming a third columnar body portion, which is obliquely erected in a direction different from that of the second columnar body portion, on the second columnar body portion,
    wherein the fourth step is repeated at least one time so as to form the columnar body including n (n≧2) stages of columnar body portions in which obliquely erected directions of odd-numbered stages of columnar body portions and even-numbered stages of columnar body portions are different from each other.

* * * * *